United States Patent
Zhang et al.

(10) Patent No.: US 10,051,659 B2
(45) Date of Patent: Aug. 14, 2018

(54) METHOD AND APPARATUS FOR COORDINATED ORTHOGONAL CHANNEL ACCESS (COCA)

(71) Applicant: INTERDIGITAL PATENT HOLDINGS, INC., Wilmington, DE (US)

(72) Inventors: Guodong Zhang, Syosset, NY (US); Xiaofei Wang, Cedar Grove, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 103 days.

(21) Appl. No.: 14/441,351

(22) PCT Filed: Nov. 8, 2013

(86) PCT No.: PCT/US2013/069168
§ 371 (c)(1),
(2) Date: May 7, 2015

(87) PCT Pub. No.: WO2014/074832
PCT Pub. Date: May 15, 2014

(65) Prior Publication Data
US 2015/0282211 A1 Oct. 1, 2015

Related U.S. Application Data

(60) Provisional application No. 61/724,683, filed on Nov. 9, 2012.

(51) Int. Cl.
*H04W 74/06* (2009.01)
*H04L 5/00* (2006.01)
(Continued)

(52) U.S. Cl.
CPC ............ *H04W 74/06* (2013.01); *H04L 5/0053* (2013.01); *H04W 74/006* (2013.01); *H04W 84/042* (2013.01)

(58) Field of Classification Search
None
See application file for complete search history.

(56) References Cited

U.S. PATENT DOCUMENTS 7,843,819 B1   11/2010   Benveniste
8,559,361 B1 *  10/2013   Mishra ............. H04W 52/0229
                                          370/318
(Continued)

FOREIGN PATENT DOCUMENTS

WO           11/137408          11/2011
WO      WO 2012149953 A1 *     11/2012   ........... H04L 5/0053
WO           13/039512           3/2013

OTHER PUBLICATIONS

IEEE P802.11ah/D1.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D1.0 (Oct. 2013).

(Continued)

*Primary Examiner* — Suk Jin Kang
(74) *Attorney, Agent, or Firm* — Volpe and Koenig, P.C.

(57) ABSTRACT

A method and apparatus for coordinated orthogonal channel access (COCA) are described. A wireless transmit/receive unit (WTRU) of a plurality of WTRUs receives a trigger to transmit an uplink (UL) control frame on a channel simultaneously with at least one other of the plurality of WTRUs. The WTRU transmits the control frame on the channel in response to receiving the trigger.

19 Claims, 16 Drawing Sheets

(51) Int. Cl.
  *H04W 84/04* (2009.01)
  *H04W 74/00* (2009.01)

(56) References Cited

U.S. PATENT DOCUMENTS

| | | | | |
|---|---|---|---|---|
| 9,246,562 B2* | 1/2016 | Lee | | H04B 7/0452 |
| 9,295,074 B2* | 3/2016 | Zhu | | H04W 72/121 |
| 9,706,505 B2 | 7/2017 | Pietraski et al. | | |
| 2005/0015703 A1* | 1/2005 | Terry | | H04L 1/1685 |
| | | | | 714/776 |
| 2005/0141420 A1* | 6/2005 | Li | | H04L 12/2854 |
| | | | | 370/230 |
| 2006/0062181 A1* | 3/2006 | Chou | | H04L 41/5003 |
| | | | | 370/329 |
| 2008/0298488 A1* | 12/2008 | Shen | | H04W 72/0406 |
| | | | | 375/260 |
| 2009/0046641 A1* | 2/2009 | Wang | | H04W 74/002 |
| | | | | 370/329 |
| 2009/0111403 A1* | 4/2009 | van Rooyen | | H04B 1/7107 |
| | | | | 455/133 |
| 2009/0296619 A1* | 12/2009 | Sammour | | H04W 4/08 |
| | | | | 370/311 |
| 2011/0113156 A1* | 5/2011 | Li | | H04L 47/2491 |
| | | | | 709/248 |
| 2011/0149822 A1* | 6/2011 | Sammour | | H04W 4/08 |
| | | | | 370/311 |
| 2011/0211564 A1* | 9/2011 | Yoneyama | | H04W 74/06 |
| | | | | 370/338 |
| 2012/0113831 A1* | 5/2012 | Pelletier | | H04L 5/0058 |
| | | | | 370/252 |
| 2013/0301523 A1* | 11/2013 | Asterjadhi | | H04W 72/0406 |
| | | | | 370/328 |
| 2013/0301605 A1* | 11/2013 | Kim | | H04L 1/00 |
| | | | | 370/330 |
| 2014/0036772 A1* | 2/2014 | Asterjadhi | | H04W 28/06 |
| | | | | 370/328 |
| 2014/0050185 A1* | 2/2014 | Hooli | | H04L 5/0053 |
| | | | | 370/329 |
| 2014/0071959 A1* | 3/2014 | Ghosh | | H04W 72/0426 |
| | | | | 370/336 |
| 2014/0133338 A1* | 5/2014 | Yoneyama | | H04W 74/06 |
| | | | | 370/252 |
| 2014/0307667 A1* | 10/2014 | Wager | | H04W 74/006 |
| | | | | 370/329 |
| 2015/0023236 A1* | 1/2015 | Choi | | H04W 52/0225 |
| | | | | 370/311 |
| 2015/0103767 A1* | 4/2015 | Kim | | H04W 74/06 |
| | | | | 370/329 |
| 2015/0173012 A1* | 6/2015 | Seok | | H04W 52/0216 |
| | | | | 370/311 |
| 2015/0305019 A1* | 10/2015 | Kim | | H04L 1/1854 |
| | | | | 370/336 |
| 2016/0088665 A1* | 3/2016 | Kim | | H04W 76/021 |
| | | | | 370/329 |
| 2016/0105270 A1* | 4/2016 | Yang | | H04L 1/1607 |
| | | | | 370/280 |
| 2016/0353378 A1* | 12/2016 | Kim | | H04W 74/06 |
| 2016/0374090 A1* | 12/2016 | Kim | | H04L 1/1861 |
| 2017/0019280 A1* | 1/2017 | Han | | H04L 5/0051 |
| 2017/0086139 A1* | 3/2017 | Chu | | H04W 52/0206 |
| 2017/0118602 A1* | 4/2017 | Seok | | H04W 4/06 |
| 2017/0135006 A1* | 5/2017 | Ma | | H04W 36/08 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
Park, "IEEE P802.11, Wireless LANs, Proposed Specification Framework for TGah," IEEE 802.11-11/1137r11 (Sep. 19, 2012).
IEEE P802.11ac/D3.0, Draft Standard for Information Technology—Telecommunications and information exchange between systems—Local and metropolitan area networks—Specific requirements; Part 11: Wireless LAN Medium Access Control (MAC) and Physical Layer (PHY) specifications, Amendment 4: Enhancements for Very High Throughput for Operation in Bands below 6 GHz, IEEE P802.11ac/D3.0 (Jun. 2012).
Wang et al., "Supporting Large Number of STAs in 802.11ah," IEEE 802.11-11/1019r1 (Jul. 20, 2011).
Jin et al., "Simulation Study of the Performance of DCF Under Heavy Traffics for 802.11ah," IEEE 11-11/1248r0 (Sep. 15, 2011).
Jin et al., "MAC considerations for 802.11ah (Probe and Pull MAC)," IEEE 11-11/1512r4 (Nov. 7, 2011).

* cited by examiner

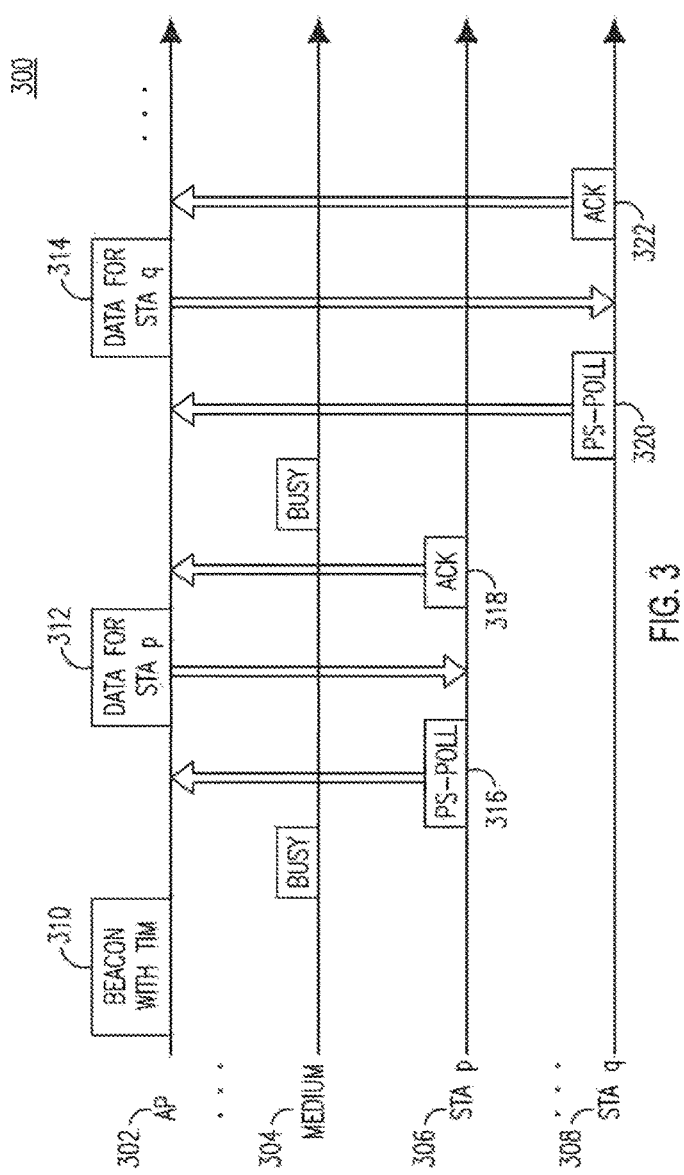

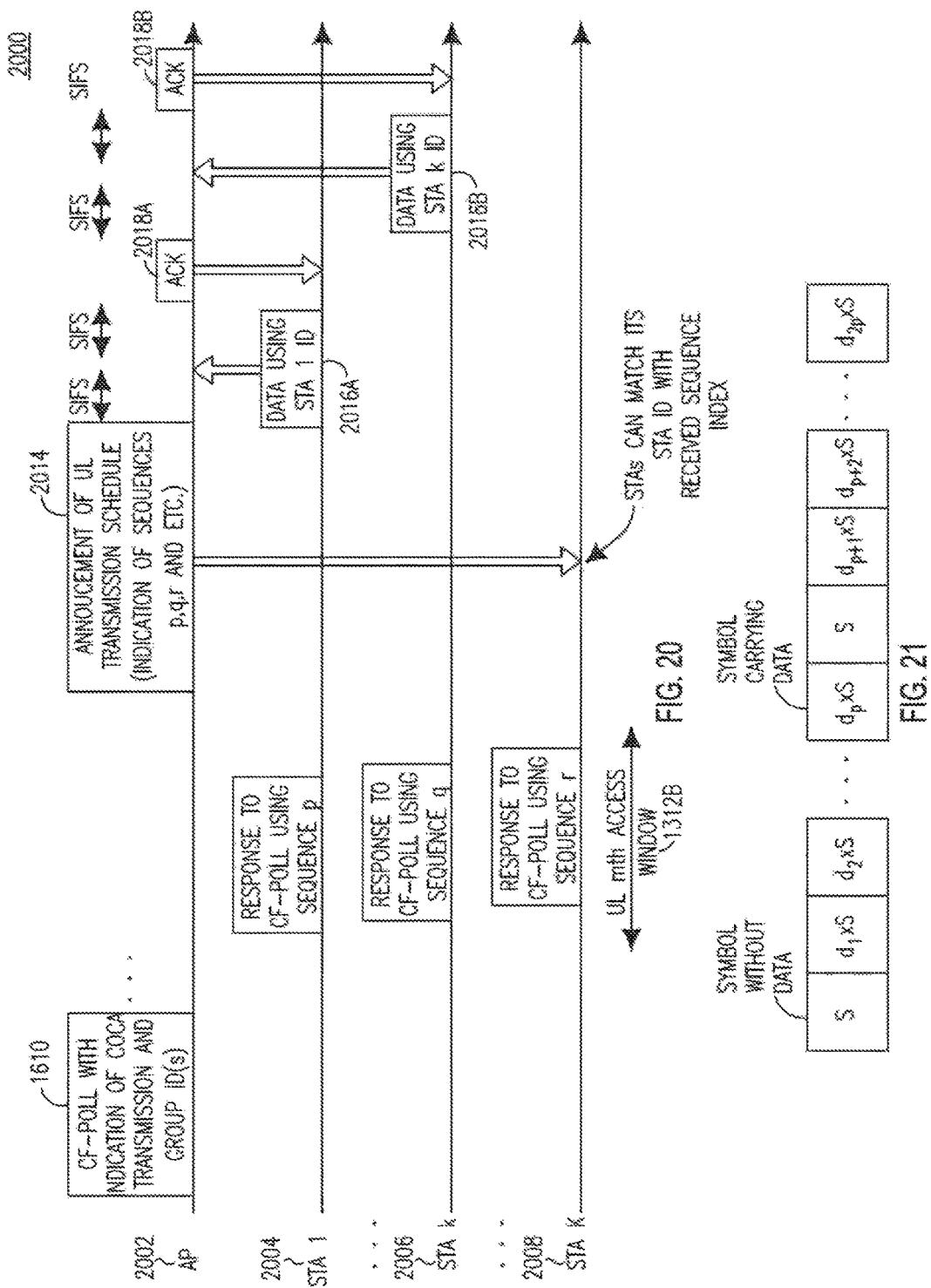

METHOD AND APPARATUS FOR COORDINATED ORTHOGONAL CHANNEL ACCESS (COCA)

CROSS REFERENCE TO RELATED APPLICATIONS

This application claims the benefit of PCT Application No. PCT/US2013/069168, filed Nov. 8, 2013, and U.S. Provisional Application No. 61/724,683, filed on Nov. 9, 2012, the contents of which are incorporated herein by reference in their entirety.

BACKGROUND

In an infrastructure basic service set (BSS) mode, a wireless local area network (WLAN) includes an access point (AP) for the BSS and one or more stations (STAs) associated with the AR The AP may have access or an interface to a distribution system (DS) or another type of wired/wireless network that carries traffic in and out of the BSS. Traffic to STAs that originates from outside the BSS may arrive through the AP, which may deliver it to the appropriate STAs. Traffic originating from STAs to destinations outside the BSS may be sent to the AP to be delivered to the respective destinations.

STAs in a BSS may communicate with one another via peer-to-peer communication. In one type of peer-to-peer communication, a source STA may send traffic to the AP, which may deliver it to a destination STA. In another type of peer-to-peer communication, a source STA may send traffic directly to a destination STA without involving the AP via a direct link setup (DLS) using an institute of Electrical and Electronics Engineers (IEEE) 802.11e DLS or an IEEE 802.11z tunneled DLS (TDLS). A WLAN in an independent BSS mode has no AP, and, accordingly, STAs may communicate directly with each other.

SUMMARY

A method and apparatus for coordinated orthogonal channel access (COCA) are described. A wireless transmit/receive unit (WTRU) of a plurality of WTRUs receives a trigger to transmit an uplink (UL) control frame on a channel simultaneously with at least one other of the plurality of WTRUs. The WTRU transmits the control frame on the channel in response to receiving the trigger. The method and apparatus described herein may be used in various wireless mediums, but are not limited to 802.11ah, 802.11 Very High Spectral Efficiency (VHSE), 802.11 WNG, 802.11n, and 802.11ac.

BRIEF DESCRIPTION OF THE DRAWINGS

A more detailed understanding may be had from the following description, given by way of example in conjunction with the accompanying drawings wherein:

FIG. 3 is a signal diagram of a traffic indication message (TIM)-based downlink (DL) data retrieval for an Institute of Electrical and Electronics Engineers (IEEE) 802.11 power savings mode;

FIG. 4 is a diagram of an example coordinated orthogonal channel access (COCA) support sub-field in a capability information element (IE) or field;

FIG. 20 is a signal diagram of an example of UL data transfer using COCA transmission of a response to a CF-Poll frame; and FIG. 21 is a diagram of an example COCA frame carrying a message and/or information.

DETAILED DESCRIPTION

Figure 1A:
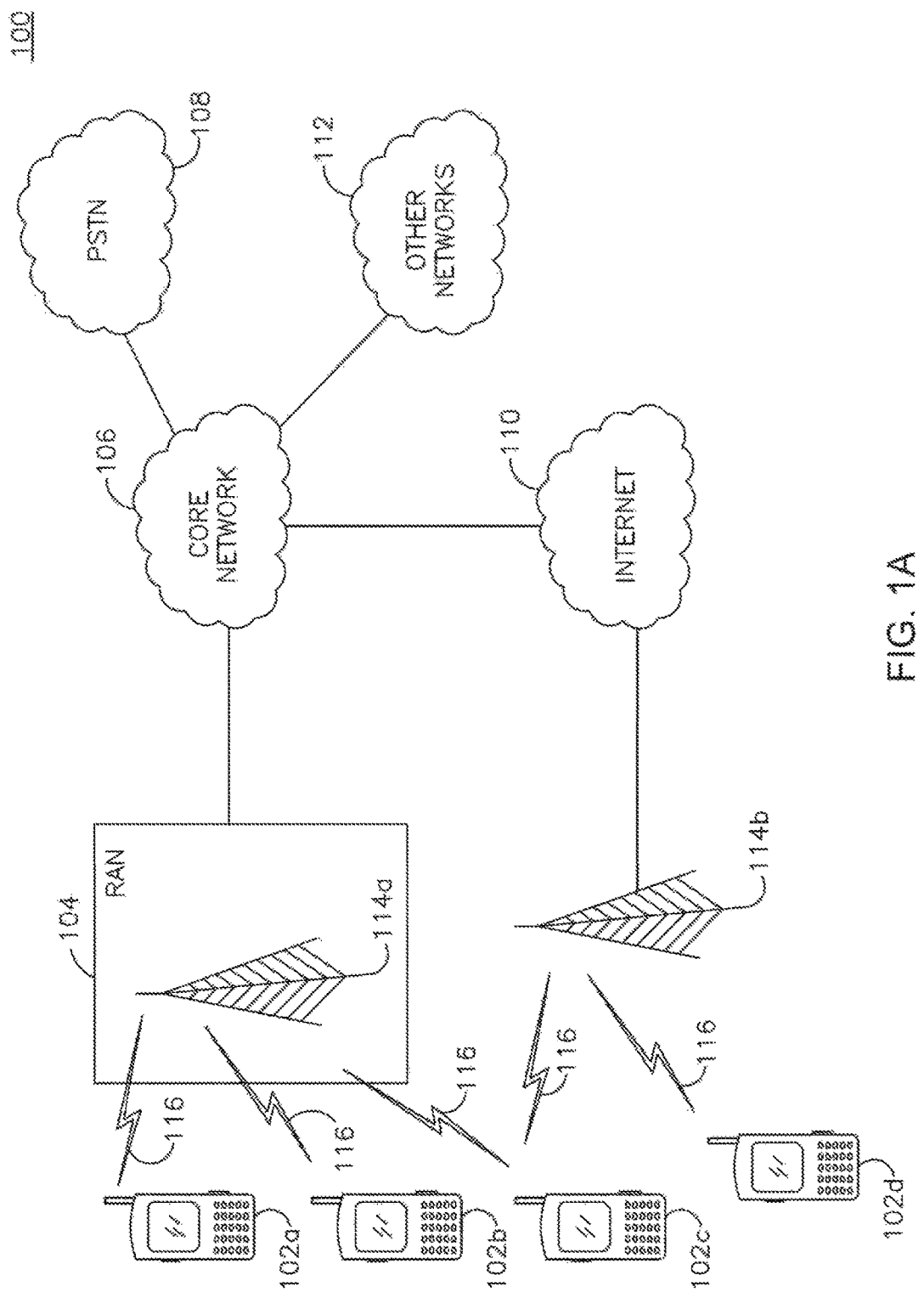
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal frequency division multiplexing (OFDM), orthogonal FDMA (OFDMA), single-carrier FDMA (SC FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a station (STA) a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a anchor the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDM, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), IEEE 802.11 (WLAN), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized, area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre paid calling, Internet connectivity, video distribution, etc, anti/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 1108 may also be in communication with another RAN (not shown) employing a GSM radio technology.

The core network 108 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
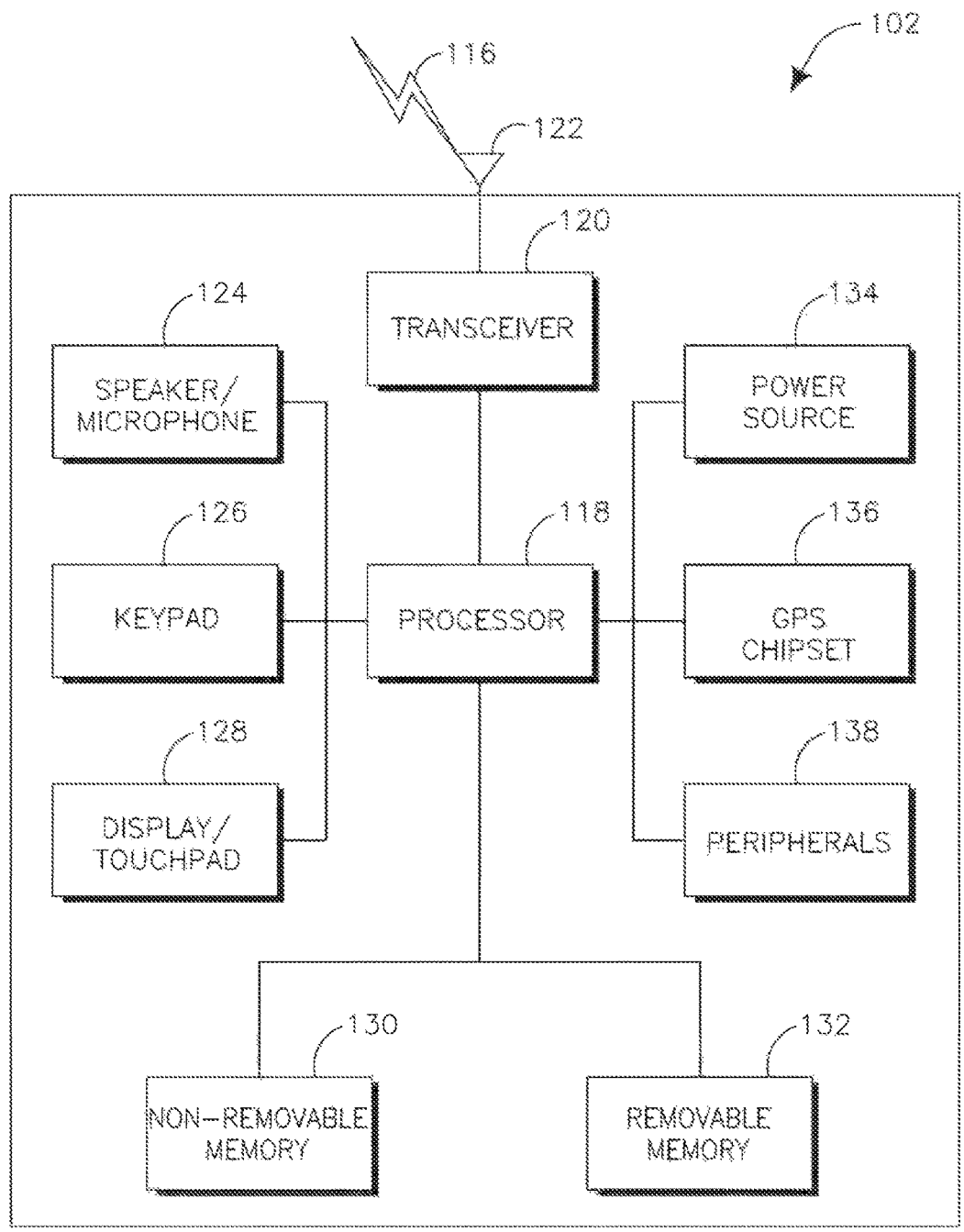
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, may receive user input data from, the speaker/microphone 124, the keypad 126, and/or the display/touchpad 128 (e.g., a liquid crystal display (LCD) display unit or organic light-emitting diode (OLED) display unit). The processor 118 may also output, user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable, device for powering the WTRU 102. For example, the power source 134 may include one or more dry coil batteries (e.g., nickel-cadmium (NiCd), nickel-zinc (NiZn), nickel metal hydride (NiMH), lithium-ion (Li-ion), etc), solar cells, fuel cells, and the like.

The processor 118 may also be coupled to the GPS chipset 136, which may be configured to provide location information (e.g., longitude and latitude) regarding the current location of the WTRU 102. In addition to, or in lieu of the information from the GPS chipset 136, the WTRU 102 may receive location information over the air interface 110 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
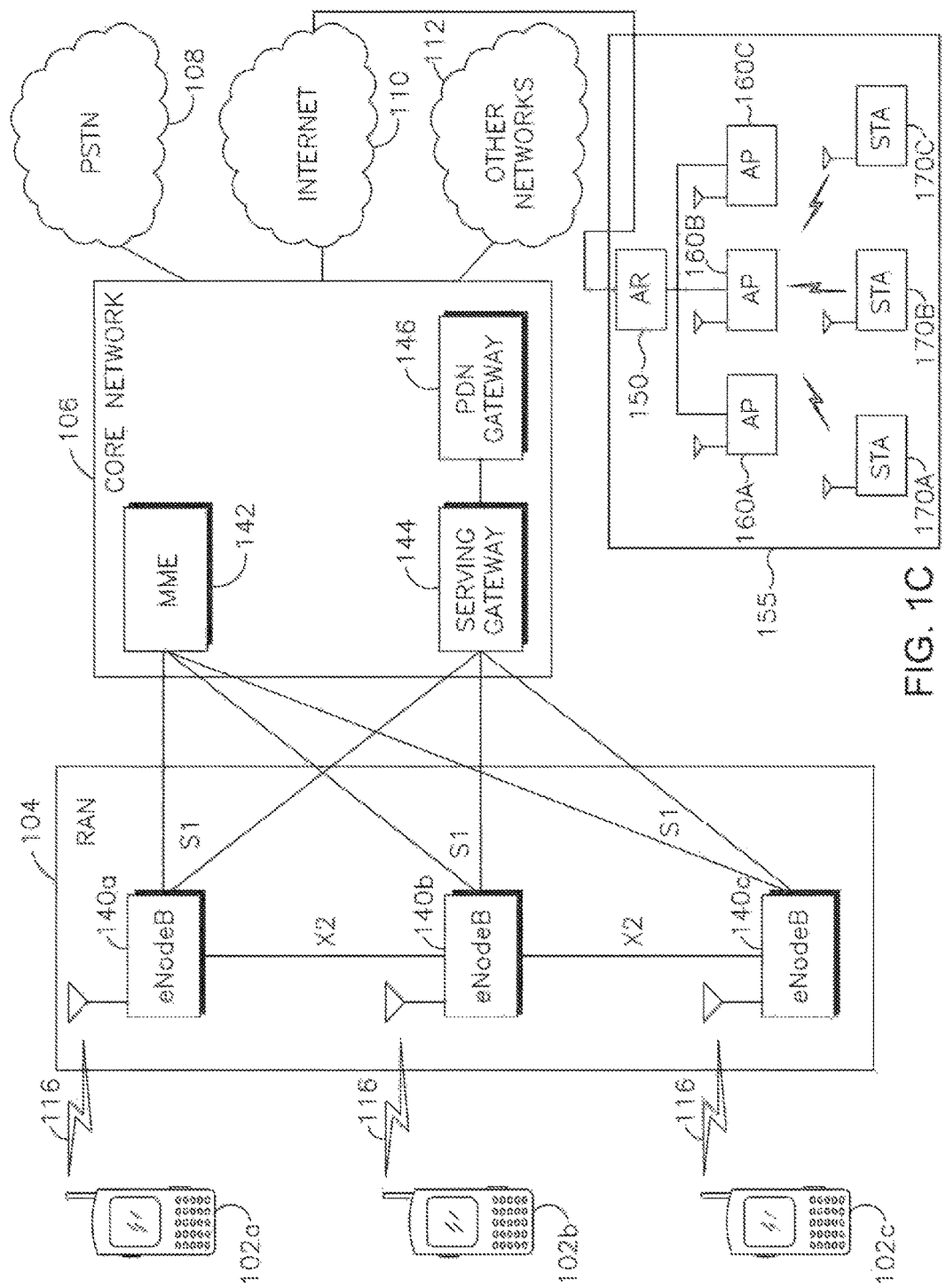
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 110. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 1.02c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c, The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and 1P-enabled devices. An access router (AR) 150 of a wireless local area network (WLAN) 155 may be in communication with the Internet 110. The AR 150 ma facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 108 may provide the WTRUs 102a, 102b, 102c with access to the networks 112, which may include other wired or wireless networks that are owned and/or operated by other service providers.

Figure 2:
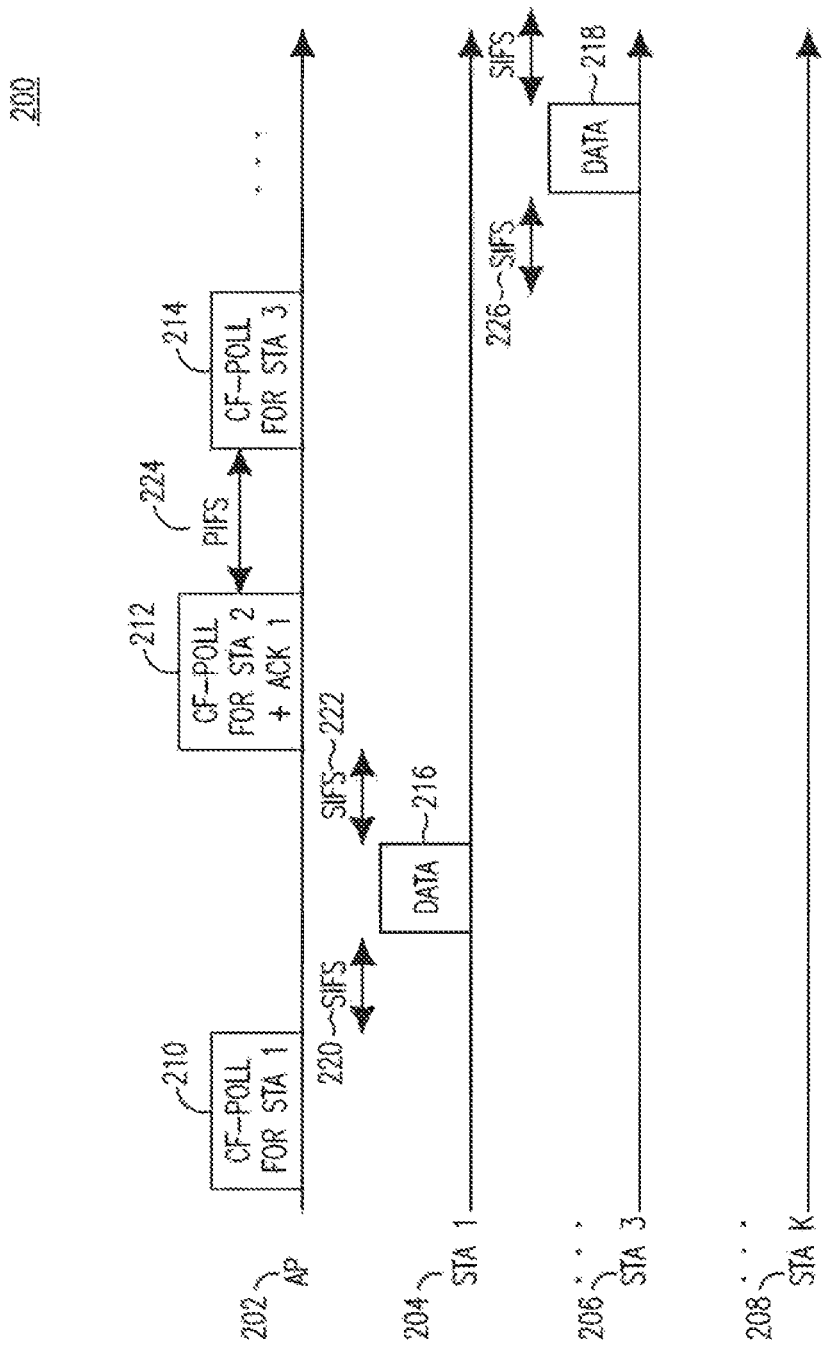
FIG. 2 is a signal diagram of an uplink data transfer using a coordination function (CF)-Poll during a contention-free period (CFP) for a WiFi system using a point coordination function (PCF)

FIG. 2 is a signal diagram 200 of an uplink (UL) data transfer using a coordination function (CF)-Poll during a contention-free period (CFP) for a WiFi system using a point coordination function (PCF). In the example illustrated in FIG. 2, the BSS includes an AP 202 and STAs 202, 204 and 206. During the CFP, the AP 202 may poll the STAs in the BSS (e.g. 202, 204 and 206) using a contention-free-poll (CF-Poll) frame to inquire whether they have UL data to transmit. In the example illustrated in FIG. 2, the AP 202 transmits a CF-Poll 210 for STA 210. The CF-Poll may include a transmission opportunity (TXOP) during which the STA being polled may transmit any UL data it has for transmission. In the example illustrated in FIG. 2, the STA 204 has UL data for transmission, and it transmits the data 216 a short inter-frame space (SIFS) 220 after the CF-Poll 210.

On a condition that the STA being polled has no data to transmit, the polled STA may not respond to the CF-Poll. In this example, on a condition that the AP does not detect as response from the polled STA within a PCF inter-frame space (PIFS), it may poll the next STA. In the example illustrated in FIG. 2, the AP 202 transmits a CF-Poll 212 for the next STA a SIFS 222 after the STA 204 transmits its data 216. The CF-Poll 212 may include an acknowledgement (ACK) for the data 216 transmitted by the STA 204. In this example, the next STA may not have any UL data to transmit, so it may not respond to the CF-Poll 212. Accordingly, the AP 202 may not receive a response from the next STA, and, after a PIFS 224, the AP may transmit a CF-Poll 214 for the next STA 206. The STA 206 has UL data to transmit, so it may transmit the data 218 a SIFS 226 after the CF-Poll 214. This process may be repeated until all of the STAs in the BSS have had an opportunity to transmit their UL data through and including the last STA 208.

FIG. 3 is a signal diagram 300 of a traffic indication message (TIM)-based downlink (DL) data retrieval for an IEEE 802.11 power savings mode. In the example illustrated in FIG. 3, the BSS includes an AP 302, a medium 304, and STAs 306 and 308. The AP 302 may be aware of a power saving mode of any of its STAs and, accordingly, may buffer data for STAs in a doze state and notify those STAs that it has DL data buffered for it using a TIM or delivery TIM (DTIM) in a beacon frame 310. During the doze state, one or more STAs may achieve power savings by entering into the doze state and waking up to listen for the beacon to receive the TIM or DTIM to determine whether the AP has buffered traffic on its behalf. If the STA receives a positive indication in the TIM, it may send a power save poll (PS-Poll) control frame to the AP to retrieve buffered frames from the AP. One or more STAs may use a random back-off algorithm before transmitting the PS-Poll frames when multiple STAs have buffered frames at the AP.

In the example illustrated in FIG. 3, the STAs 306 and 308 receive positive TIM indications in the beacon 310. The STA 306 may transmit its PS-Poll 316 over the medium 304 and wait to receive the data 312 that the AP 302 buffered on its behalf. In response to receiving the data 312, the STA 306 transmits its ACK 318 for the data 312. Similarly, the STA 308 may transmit its PS-Poll 320 and wait to receive the data 314 that the AP buffered on its behalf. In response to receiving the data 314, the STA 308 may transmit its ACK 322 for the data 314.

Several possibilities for sending ACKs concurrently have been considered for IEEE 802.11 in response to a newly designed probe frame. Such possibilities include partitioning STAs into groups, sending a probe to a group of STAs, STAs with no data sending ACKs concurrently in a time-aligned manner, the AP resolving parallel ACKs with the use of Zadoff-Chu sequences and the AP scheduling and initiating data transmissions with PULL.

WLAN systems are being required to support more and more STAs per BSS. For example, IEEE 802.11ah systems may be required to support up to six thousand devices.

However, the distributed coordination function (DCF) for WLAN systems may be inefficient when a large number of STAs compete for channel access, particularly with respect to throughput and energy consumption. For example, in TIM-based DL data retrieval, there ma be collisions among UL PS-Poll frames when a large number of STAs in a BSS have a positive indication in the TIM. This may cause a long delay for DL data retrieval.

Further, although the PCF may provide contention-free channel access, it may have a large overhead for sequential polling of STAs. For example, when a large number of STAs in a BSS have bursty UL traffic, using a CF-Poll to schedule UL data transmissions may consume too much airtime overhead because each STA may need to be polled on a one-by-one basis using a CF-Poll.

Accordingly, embodiments described herein may enable simultaneous UL transmission of control channels, for example, to improve the spectral efficiency of the network and reduce the delay of data transmissions. For example, coordinated orthogonal channel access (COCA) mechanisms may enable simultaneous UL transmission of multiple control frames while mitigating interference between UL transmissions that may otherwise occur. COCA mechanisms may include capability indications to support COCA procedures, configurations for COCA operation, synchronization of COCA operations and procedures, identification of multiple COCA frames and/or carrying information on a COCA frame.

The grouping mechanism for IEEE 802.11 was designed only for DL multi-user multiple input multiple output (MIMO). Accordingly, the design did not include any mechanism for UL group management. In addition, in order for an AP to conduct effective grouping of users, it may acquire sufficient information about the STAs, a process that may add to the overall overhead. Accordingly, embodiments are described herein that may provide grouping and group management mechanisms for simultaneous UL transmission of control channels that may be used to enable the AP to acquire information about the STAs with limited overhead and to conduct grouping effectively and efficiently.

The embodiments described herein are described with respect to an example IEEE 802.11 network that includes STAs and APs. However, the STAs and APs may be any type of suitable WTRU or base station.

STAs involved in COCA transmissions may need to first be configured to use them. For example, STAs may be configured to indicate to an AP that they support COCA operations using any of a number of different embodiments.

In one embodiment, a STA (e.g., an AP or non-AP STA) may indicate its capability for COCA procedures, or simultaneous multiple frame transmission/reception, by setting its Capability information element (IE) in a management or control frame (e.g., Association Request and Response frames, Probe Request/Response frames, or a Beacon) to indicate that it has capability for this type of operation. A COCA support subfield, for example, may be added in the Capability information field in the Association Request and Response frames. The STA may set this sub-field to "1" on a condition that it supports COCA transmission (or dot11COCAOptionImplemented is true) and to "0" otherwise. In another embodiment, a COCA support subfield in the information field may include capability information for each application of simultaneous multiple frame transmission (e.g., UL PS-Poll or response to CF-Poll).

FIG. 4 is a diagram of an example COCA support sub-field 400 in a capability IE or field. The example COCA support sub-field 400 includes a number of frames 402, 404, 400 and 408, however, a COCA support sub-field may include any number of frames, each of which may include capability information for a particular application of simultaneous multiple frame transmission supported by the STA. In the example illustrated in FIG. 4, the frame 402 indicates that the STA has the capability of supporting COCA transmission of UL PS-Poll, frame 404 indicates that the STA has the capability of supporting reception of COCA UL PS-Poll frames, frame 406 indicates that the STA has the capability of supporting COCA transmission of multiple responses to a CF-Poll, and frame 408 indicates that the STA has the capability of supporting reception of COCA responses to a CF-Poll.

In an other embodiment, the capability for COCA transmission/reception may be indicated, for example, in a COCA Support Capability IE.

An AP that intends to use simultaneous multiple UL frames from one or more STAs for a particular application or procedure may determine whether the intended STAs are capable of supporting simultaneous multiple UL frame transmission, for example, based on its simultaneous multiple frame transmission/reception sub-field in the Capability IE or the COCA Support Capability IE.

STAs intended for COCA transmissions may be grouped using either modified IEEE 802.11ac grouping procedures or new grouping procedures. New grouping procedures may use a pre-determined grouping strategy or may be grouped using an ad hoc strategy.

For the purpose of COCA procedures, STAs may be group according to one or more criteria. The one or more criteria may include, for example, operating channel width, received power at the AP, quality of service (QoS) priorities/requirements, synchronizations, schedule requirement, sleeping schedules, spatial locations, channel characteristics, STA capabilities and preferences, STA types (such as sensor/meters or regular WiFi devices), power constraints, operation mode, or channel quality. COCA groups may be defined for different purposes, such as PS-Poll or response to CF-Poll.

Figure 5:
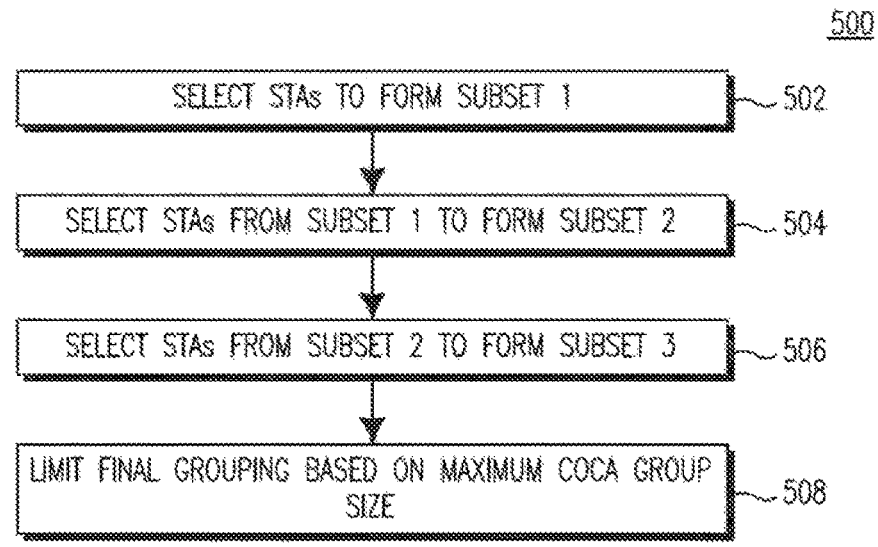
FIG. 5 is a flow diagram of an example method of COCA grouping.

FIG. 5 is a flow diagram of an example method of COCA grouping 500. In the example illustrated in FIG. 5, an AP selects STAs to form a Subset 1 (502). The AP may select STAs, for example, that are COCA-capable, have the same STA type, capability or category (e.g., meter/sensor or cellular offloading), have similar sleeping schedules, and/or use similar periodicities. The AP may further select STAs from the candidate subset 1 to form candidate Subset 2 (504), wherein, for example, the received power at the AP of each STA in the group is similar to each other. The exact range variations among STAs in Subset 2 may depend on the orthogonal preamble design, AP receiver capability, type, or the STA's power adjustment capabilities. While the term preamble is used above, one of ordinary skill in the art will understand that a preamble may also be a sequence, such as an IEEE 802.11 WiFi sequence, and may be referred to in the following paragraphs as a sequence/preamble.

The AP may further select STAs from the candidate Subset 2 to form candidate Subset 3 (506), wherein the propagation delay among grouped STAs may be similar. A delay range among STAs in Subset 3 may depend on, for example, the orthogonal sequence/preamble design, the Guard Interval (GI) value, BSS coverage radius, and/or the STA's timing adjustment capabilities. The final COCA group may also depend on a maximum COCA group size limit (508), which may be limited, for example, by the number of available orthogonal sequences/preambles and/or the maximum number of orthogonal sequences/preambles that the AP can decode.

The AP may inform the STAs of their grouping using frames that include a COCA Group Configuration Information Element (IE) or field, such as any of the COCA Group Configuration IEs described below with respect to FIGS. 6-10. To do so, the AP may transmit a management or control frame that uses the Group Configuration or IE or field to one or more STAs. The AP may also transmit other information to the one or more STAs in the management or control frame.

STAs that are allocated to a COCA group may also be allocated to a group as defined by a 802.11ac IE group identifier. In an embodiment, the COCA IE group identifier may be used in addition to, in parallel with and/or instead of the IEEE 802.11ac IE group identifier.

Different types of COCA Group Configuration IEs are described herein, including a Unicast Group Configuration IE and a Broadcast Group Configuration IE.

Figure 6:
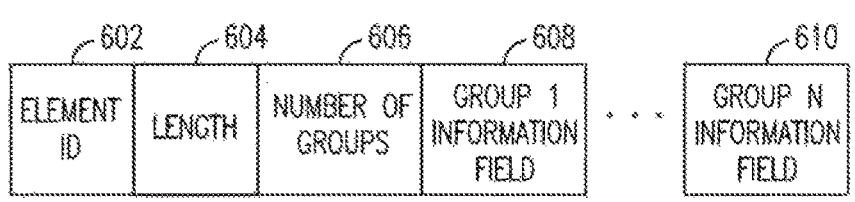
FIG. 6 is a diagram of an example Unicast COCA Group Configuration IE.

FIG. 6 is a diagram of an example Unicast COCA Group Configuration IE 600. The example Unicast COCA Group Configuration IE 600 includes an element ID field 602, a length field 604, a number of groups field 606 and group i (i=1, . . . , N) information fields 608 and 610. The element ID field 602 may identify that the IE is a Unicast COCA Group Configuration IE, the length field 604 may indicate the length of the IE, and the number of groups field 606 may indicate the number of groups included in the IE. Each of the group i information fields (e.g., group 1 information field 608 and group N information field 610) may include the information of a group membership for the STA. Since a STA may be included in any number of groups, the number of group i information fields included in a Unicast COCA Group Configuration IE may vary.

Figure 7:
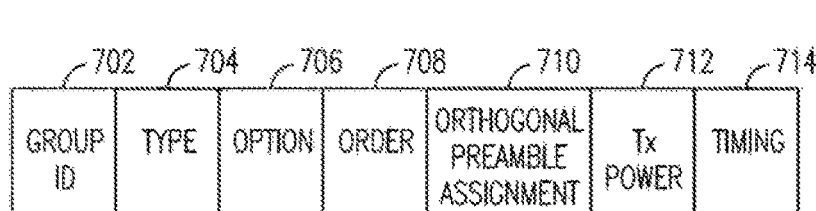
FIG. 7 is a diagram of an example group information field for a Unicast COCA Group Configuration IE.

FIG. 7 is a diagram of an example group i information field 700 for a Unicast COCA Group Configuration IE. The example group i information field 700 includes a group ID field 702, a type field 704, an option field 706, an order field 708, an orthogonal preamble assignment field 710, a transmit (Tx) power field 712, and a timing field 714. The group ID 702 may be the ID of the group that the STA or STAs belong to. The type field 704 may include information about the type of group indicated by the ID 702. In an embodiment, the type of group may be a simultaneous UL PS-Poll group, a CF-Poll Response group, or other any other type of group. The option field 706 may be implemented as a bitmap or other encoding to indicate which types of information are included in the remainder of the group i information field 700.

The order field 708 may indicate the order of the STA within the group to facilitate the sequential transmission within the group following a COCA transmission. The orthogonal preamble assignment field 710 may indicate the orthogonal sequence/preamble assignment of the STA or the assignment of it set of orthogonal sequences/preambles for STAs in the group. Using this field, the AP may either assign an orthogonal COCA sequence to each STA within a group or assign a set of orthogonal COCA sequences to a group of STAs configured for simultaneous multiple frame transmission. The orthogonal sequence/preamble selection rule may also be included in this field. The Tx power field 712 may indicate the transmit power the STA should use to transmit when conducting COCA transmissions in the current group. The timing field 714 may indicate a delay that the STA must adjust for when participating in COCA transmissions to the AP in the current group. This delay may be used to adjust for the difference in the propagation delay from each STA such that the COCA UL packets arrive at the AP within a GI. The delay may be positive or negative and may be implemented using 2's complement.

In an embodiment, an AP may manage one or more COCA groups simultaneously by transmitting a broadcast frame including a Broadcast COCA Group Management IE or field.

Figure 8:
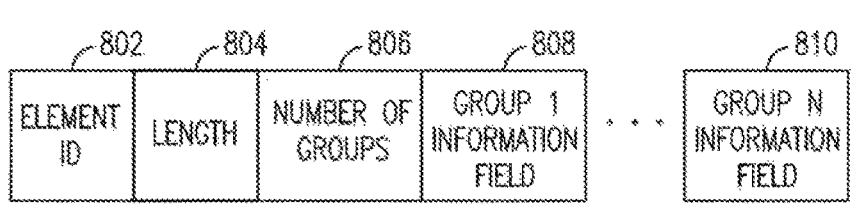
FIG. 8 is a diagram of an example Broadcast COCA Group Management IE.

FIG. 8 is a diagram of an example Broadcast COCA Group Management IE 800. The illustrated Broadcast COCA Group Management IE 800 includes an element ID field 802, a length field 804, a number of groups field 806, and group i (i=1, . . . , N) information fields 808 and 810. The element ID field 802 may identify that the IE is a Broadcast COCA Group Configuration IE. The length field 804 may indicate the length of the Broadcast COCA Group Configuration IE. The number of groups field 806 may indicate the number of groups included in the Broadcast COCA Group Configuration IE. Each of the group i information fields (e.g., group information fields 808 and 810) may include information about a group membership and is described in more detail below with respect to FIG. 9.

Figure 9:
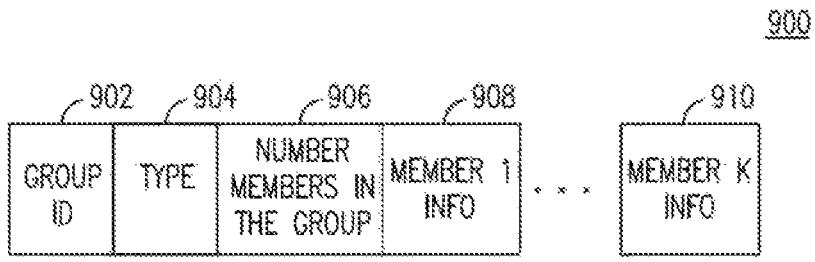
FIG. 9 is a diagram of an example group i information field for a Broadcast COCA Group Configuration IE.

FIG. 9 is a diagram of an example group i information field 900 for a Broadcast COCA Group Configuration IE. The illustrated group i information field 900 includes a group ID field 902, a type field 904, a number of members in the group field 906, and member k (k=1 to K) information fields 908 and 910. The group ID field 902 may include an ID of a group that the STA or STAs belong to. The type field 904 may include information about the type of group that the STA or STAs belong to. This field may be used to indicate, for example, that the group is a simultaneous UL PS-Poll group, a CF-Poll response group, or any other type of group. The number of members in the group field 906 may include information about the number of STAs included in the group and may be indicated by the group ID. Each of the member k information fields (e.g., member information fields 908 and 910) may include information of a member STA in the group.

Figure 10:
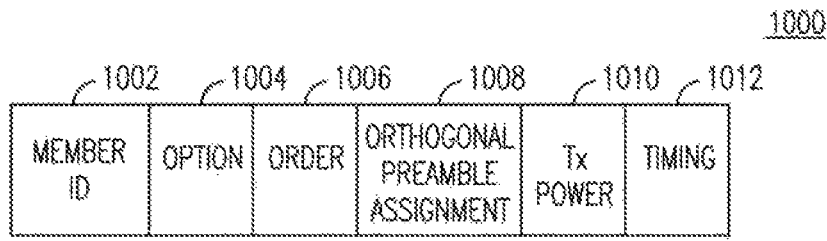
FIG. 10 is a diagram of an example member k information field of a group i information field for a Broadcast COCA Group Configuration IE.

FIG. 10 is a diagram of an example member k information field 1000 of a group i information field for a Broadcast COCA Group Configuration IE. The example member k information field 1000 includes a member ID sub-field 1002, an option sub-field 1004, an order sub-field 1006, an orthogonal preamble assignment sub-field 1008, a Tx power sub-field 1010, and a timing sub-field 1012. The member ID sub-field 1002 may include the ID of the member STA, which may be implemented as an association ID (AID), MAC address or other form of ID that the AP and the STAs agree upon. The option sub-field 1004 may be implemented as a bitmap or other encoding to indicate which types of information are included in the remainder of the member k information field 1000. The order sub-field 1006 may include information about the order of the STA within the group to facilitate the sequential transmission within the group following COCA transmission. The orthogonal preamble assignment sub-field 1008 may include an orthogonal sequence/preamble assignment of the STA or an assignment of a set of orthogonal sequences/preambles for STAs in the group. Using this sub-field, the AP may either assign an orthogonal COCA sequence to each STA within a group or assign a set of orthogonal COCA sequences to a group of STAs configured for simultaneous multiple frame transmission. The orthogonal sequence/preamble selection rule may also be included in this sub-field. The Tx power sub-field 1010 may include information about the transmit power the STA should use to transmit when conducting COCA transmissions in the current group. The timing sub-field 1012 may include information about a delay that the STA must adjust for when participating in COCA transmissions to the AP in the current group. This delay may be used to adjust for the difference in the propagation delay from each STA such that the COCA UL packets may arrive, at the AP within a GI. The delay may be positive or negative and may be implemented using 2's complement.

Figure 11:
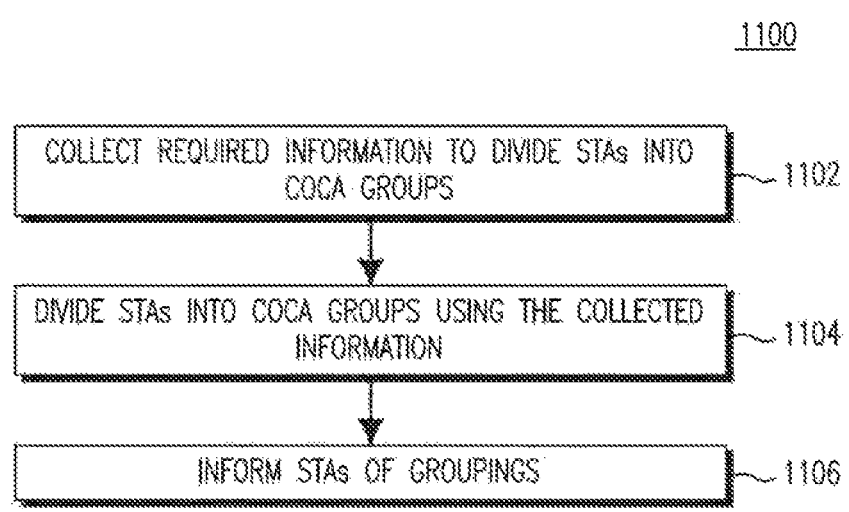
FIG. 11 is a now diagram of an example method of COCA group management.

FIG. 11 is a flow diagram of an example method of COCA group management 1100. In the example illustrated in FIG. 11, information required to divide STAs into COCA groups is collected (1102). In an embodiment, the AP may collect from a STA the information necessary to divide STAs into COCA groups, for example, by following the grouping information acquisition procedure described above. The STAs may then be divided into COCA groups (1104). In an embodiment, the AP may divide the STAs into COCA groups, and, in an example, into different COCA groups for different purposes (such as responses to CF-Poll or UL PS-Poll) by following, for example, a group selection procedure such as the one described above. STAs may then be informed of the groupings (1106). In an embodiment, the AP can send a uni-cast frame with the Uni-cast COCA Group Management Information Element or field to a particular STA. The STA may then adjust its parameters as specified in the Group Info Field for the appropriate group when participating in the associated COCA Group transmission. In another embodiment, the AP may send a broadcast frame with the Broadcast COCA Group Management IE or field to all STAs. Each STA may then adjust its parameters as indicated in the Member Info Field in the appropriate Group Info field when participating in the associated COCA Group transmission.

After a COCA group is established by the AP, the condition of a STA within the group may change over time. For example, a STA type may change or a STA may no longer be in the coverage of the BSS. A group may be maintained to accommodate these changes. To maintain a group, the AP and STA may monitor the channel between them for the purpose of COCA group maintenance, and the AP may perform group reassignment when or if it is needed. An AP or a STA may initiate a group maintenance procedure.

In an example of an AP-initiated COCA group maintenance procedure, an AP may monitor the channel between the AP and the STAs. If the STA type or sleep schedule changes, or if changes on the channel (e.g., pathloss or propagation delay) have exceeded pre-defined thresholds, the AP may conduct COCA group reassignment using the group selection procedure with the latest information about the STAs when needed.

In an example of a STA-initiated COCA group maintenance procedure, an AP may indicate that STAs should monitor the channels between the AP and the STAs. The STAs may estimate channel state information on pathloss, time-of-day (TOD) clock offset, propagation delay, etc., by using beacon frames. If a STA detects changes that have exceeded a pre-defined threshold, the STA may transmit the new information to the AP. The AP may conduct COCA group reassignment using the group selection procedure with the latest information about the STAs when needed.

A STA that transmits to an AP using any of the IEEE 802.11n/ac/af/ah standards may be synchronized with the AP on the primary channel during the initial setup procedure between the AP and the STA. This may be sufficient for DL operations that include single-or-multi-user-transmissions and UL operations that are basically single-user transmissions at a particular time period. Embodiments are described herein that may provide for timing and alignment needed to ensure that these transmission arrive at the AP within a predefined guard time so that the AP may properly detect them when multiple control frames are transmitted simultaneously.

COCA frames using orthogonal sequences/preambles from different STAs need to be synchronized within a certain range, which may depend on the design of COCA sequences. Methods are described below with respect to FIGS. 12-17 for synchronizing COCA frames from different STAs.

Figure 12:
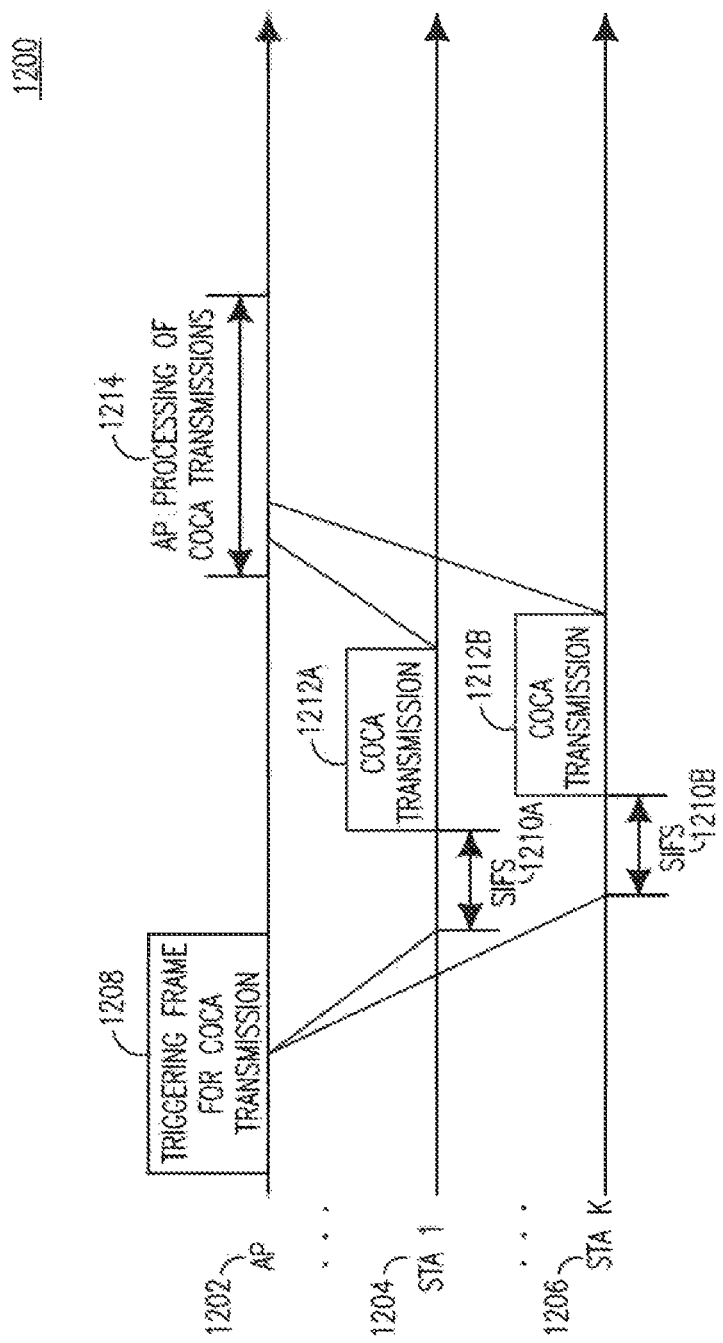
FIG. 12 is a signal diagram of an example method of timing and synchronizing COCA uplink transmissions.

FIG. 12 is a signal diagram 1200 of an example method of timing and synchronizing COCA UL transmissions. In the example illustrated in FIG. 12, an AP 1202 uses a downlink management control frame 1208 to trigger response frames from STAs (e.g., STAs 1204 and 1206) using a COCA procedure. The COCA transmission 1212*a* and 1212*b* from each STA 1204 and 1206 may be aligned at the end of the COCA triggering frame 1208 plus an inter-frame space (IFS). In the example illustrated in FIG. 12, the IFS is a short inter-frame space (SIFS) 1210*a* and 1210*b*. In an embodiment, synchronization may occur within a COCA group as described above.

Figure 13:
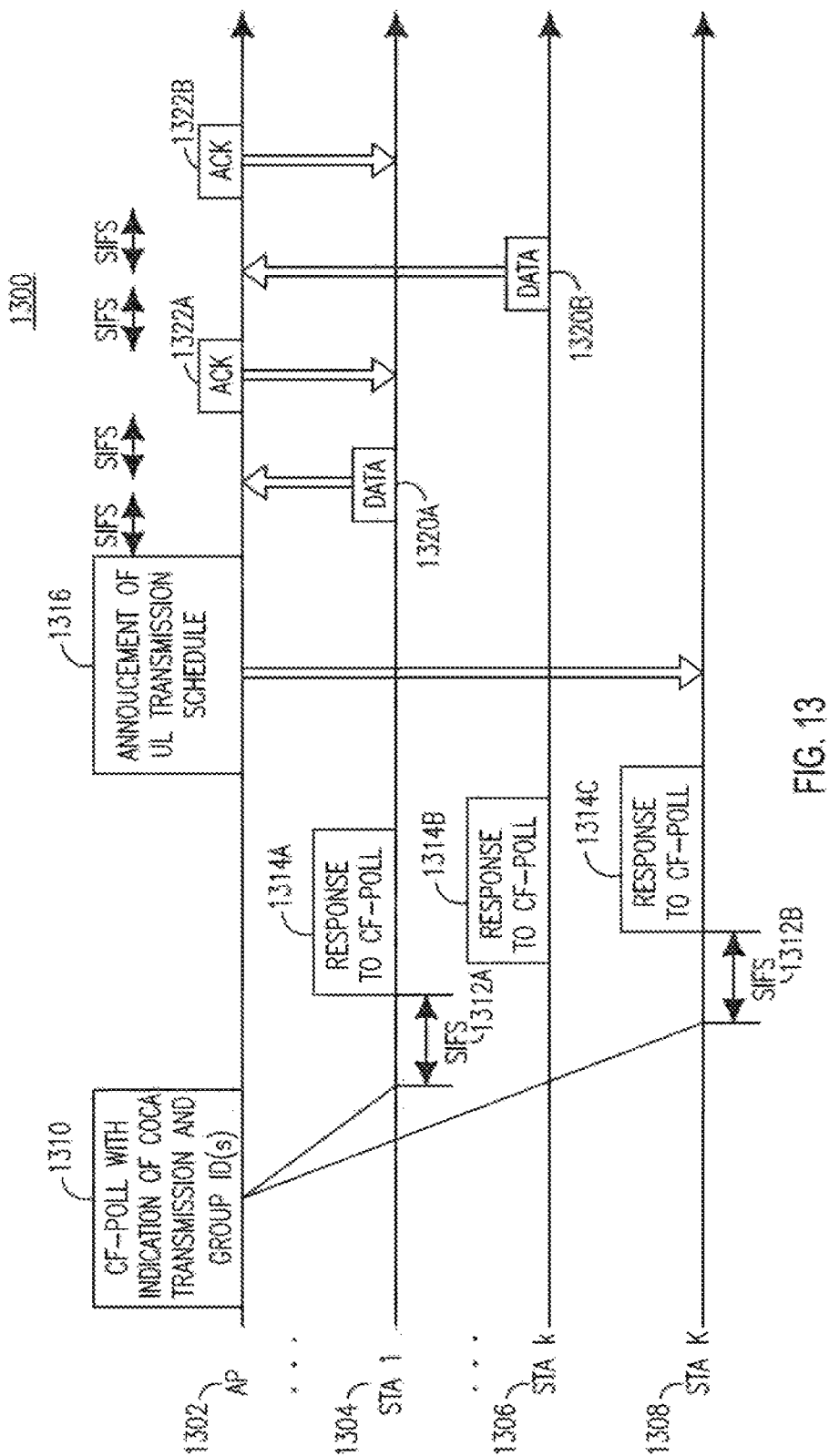
FIG. 13 is a signal diagram of an example method of responding to a CF-Poll using COCA.

FIG. 13 is a signal diagram 1300 of an example method of responding to a CF-Poll using COCA. In the example illustrated in FIG. 13, an AP 1302 transmits a CF-Poll 1310. The AP 1302 may explicitly signal an indication of COCA transmission of response to the CF-Poll frame 1310 using one or more bits in the physical layer convergence procedure (PLCP) header or the MAC header in a modified CF-Poll frame. Alternatively, the AP 1302 may implicitly signal an indication of COCA transmission of response to the CF-Poll frame 1310 using cyclic redundancy check (CRC) masking, scrambler initiation seed values, relative phase changes in signal (SIG) fields, pilot values, or patterns in the PLCP header in the modified CF-Poll frame. Alternatively, the configuration of COCA transmission of response to CF-Poll frame may be signaled in an association response frame. The group ID for the STAs being polled by the CF-Poll 1310 may be carried in the CF-Poll frame 1310 as well. Alternatively, a group broadcast address can be used in the destination address (DA) field in the MAC header.

Upon receiving a CF-Poll frame 1310 from the AP 1302 indicating a COCA response should be transmitted, each STA within the group that has UL data may transmit its response, which may be aligned at the end of the received CF-Poll frame 1310 plus an IFS. In the example illustrated in FIG. 13, each of the STAs 1304, 1306 and 1308 transmits a respective response 1314*a*, 1314*b* and 1314*c* a SIFS period 1312 after the end of the CF-Poll frame 1310.

The AP 1310 may receive and successfully detect the responses 1314*a*, 1314*b* and 1314*c* to the CF-Poll frame 1310 transmitted in a COCA manner, and, in response, may send a control frame 1316 announcing the UL transmission schedule for STAs whose responses are detected. All STAs that transmitted a COCA response to the CF-Poll 1310 may listen for the UL transmission schedule announcement frame 316 from the AP 1302. If a STA's ID is included in the UL transmission schedule, it may transmit its data to the AP 1302 according to the indicated schedule. In the example illustrated in FIG. 13, STAs 1304 and 1306 send data 1320*a* and 1320*b*, respectively, according to the schedule provided in the announcement 1316. The AP 1302 may acknowledge the data with ACK frames 1322*a* and 1322*b*, respectively.

For a STA that does not have uplink data to transmit, such a STA may not respond to a CF-Poll, and the AP may resend the CF-Poll after a multiple of a SIFS period, at a predetermined time or in the next CFP. Alternatively, such a STA may send a negative indication (NAK) to the AP to indicate that it has no uplink data to send. This method may require the orthogonal sequence/preamble to carry at least one bit of information (positive and negative indication). Either the implicit or the explicit method of carrying information described below may be used.

Figure 14:
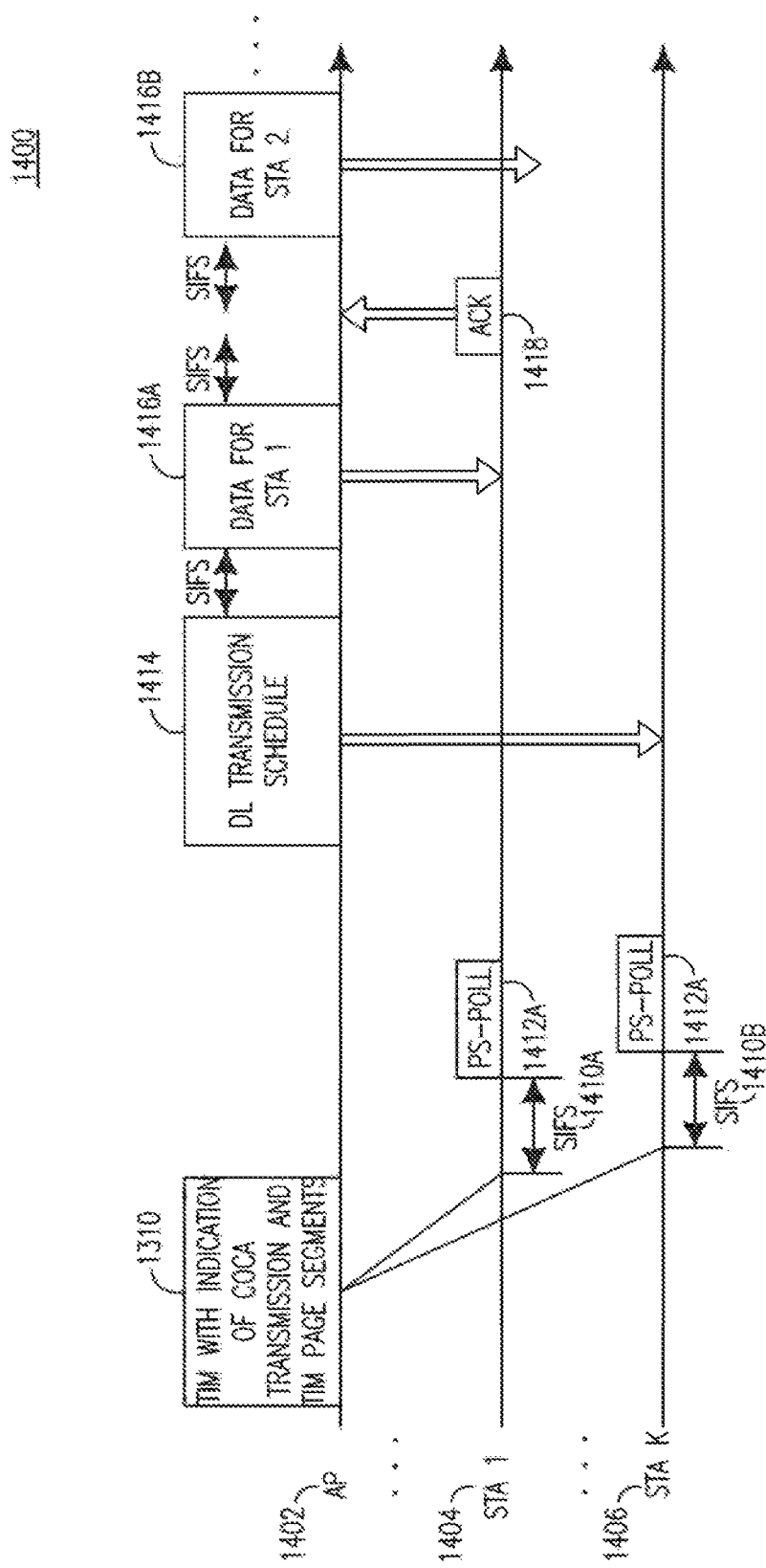
FIG. 14 is a signal diagram of a method of timing and synchronization of a power save poll (PS-Poll) for COCA DL data retrieval.

FIG. 14 is a signal diagram 1400 of a method of timing and synchronization of a PS-Poll for COCA DL data retrieval.

An AP 1402 may explicitly signal STAs to perform COCA transmission of a PS-Poll frame to retrieve DL data by using one bit in the traffic indication map (TIM), PLCP header, MAC header or an IE in a modified beacon or short beacon frame carrying the TIM. Alternatively, the AP 1402 may implicitly signal STAs to perform COCA transmission of a PS-Poll frame to retrieve DL data by using CRC masking, scrambler initiation seed values, relative phase changes in SIG fields, or pilot values or patterns in the PLCP header in the modified CF-Poll frame. Also, the implicit or explicit COCA sequence assignment may be signaled in the beacon or short beacon as well. Alternatively, the configuration of COCA transmission of a PS-Poll frame to retrieve DL data may be signaled in an association response frame. A subset of valid page segments, block segments or both may be signaled in the beacon to restrict the number of STAs that will receive the TIM 1408, which may define an equivalent group or multiple groups of STAs that may respond with COCA transmission of PS-Poll frames.

Upon receiving a positive indication in the TIM 1408, and knowing that a PS-Poll should be transmitted in a COCA manner, a STA within the first group will transmit its PS-Poll frame, which may be aligned at the end of the received TIM-carrying frame (e.g. beacon frame) plus an IFS or some predefined time interval. STAs in the subsequent groups indicated in the beacon, if any, may transmit after another triggering frame from the AP. In the example illustrated in FIG. 14, each of the STAs 1404 and 1406 receives a positive indication in the TIM 1408, and, accordingly, may transmit a respective PS-Poll frame 1412a and 1412b a SIFS period 1410a and 1410b after the TIM 1408.

The AP 1402 may receive and successfully detect several PS-Poll frames transmitted in a COCA manner and, in response, may send a control frame 1414 announcing the DL transmission schedule for STAs whose PS-Poll frames are detected (e.g., STAs 1404 and 1406). STAs that transmitted a COCA PS-Poll frame may listen for the DL transmission schedule announcement frame 1414 from the AP 1402. If the ID of a STA is included in the DL transmission schedule, it may wake up according to the schedule to receive its DL data from the AR In the example illustrated in FIG. 14, each of the STAs 1404 and 1406 wakes up to receive its DL data 1416a and 416b, respectively. STAs that receive DL data from the AP according to the schedule announced in the schedule announcement frame 1414 may acknowledge receipt of the DL data via an ACK. In the example illustrated in FIG. 14, the STA 1404 receives the DL data 1416a and sends an ACK frame 1418a SIFS period after receiving the data 1416a. STAs that transmitted COCA frames but did not receive the DL transmission schedule 1414 may transmit their PS-Polls separately.

Figure 15:
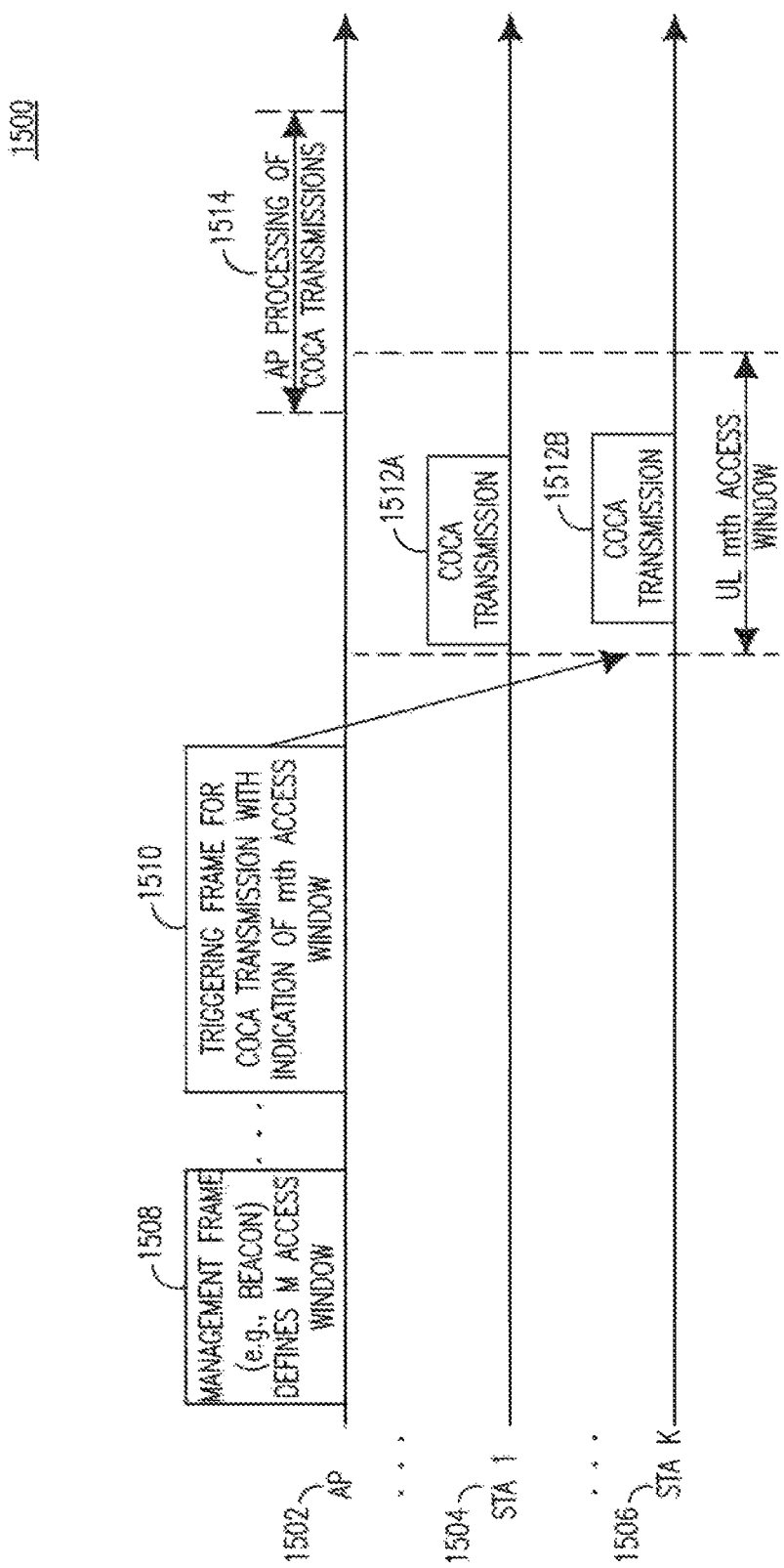
FIG. 15 is a signal diagram of a method of timing and synchronizing Power-Save-Poll (PS-Poll) using COCA were a COCA transmission is synchronized to a pre-defined uplink (UL) access interval or window

FIG. 15 is a signal diagram 1500 of an example method of timing and synchronizing Where a COCA transmission may be synchronized to a pre-defined DL access interval or window. In the example illustrated in FIG. 15, an AP 1502 signals information about a pre-defined UL access interval or window in beacon or other frames 1508. In an embodiment, the pre-defined UL access window may be preceded by a triggering frame 1510 from the AP 1502. During the pre-defined UL access window, each of the STAs 1504 and 1506 may transmit their respective COCA transmissions 1512a and 1512b, The AP 1502 may then process the COCA transmissions (1514).

Figure 16:
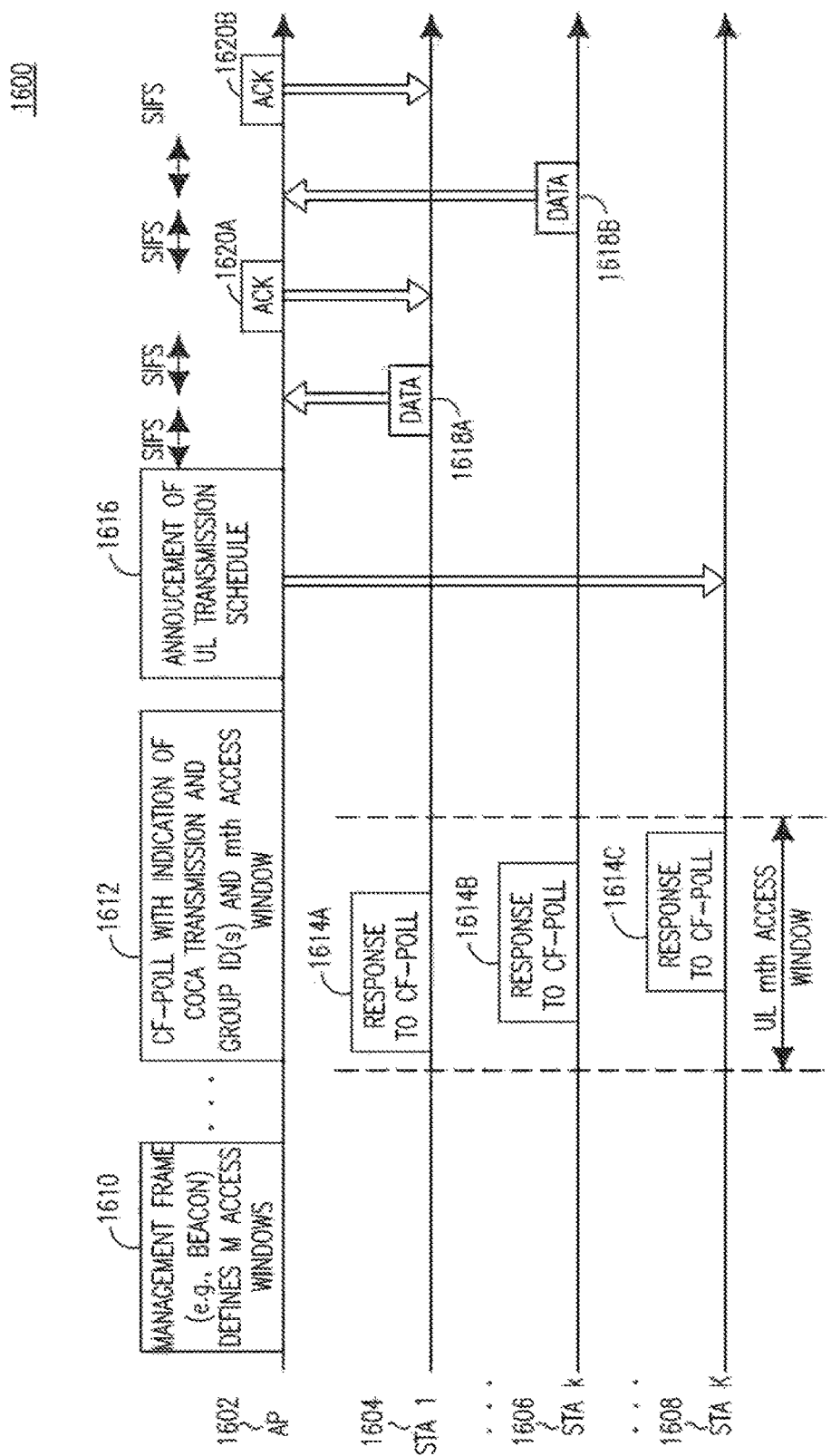
FIG. 16 is a signal diagram 1600 of timing and synchronization for response to a CF-Poll according to the method of FIG. 15.

FIG. 16 is a signal diagram 1600 of timing and synchronization for response to a CF-Poll according to the method of FIG. 15. In the example illustrated in FIG. 16, multiple UL access windows are defined and signaled by the AP 1602 in the beacon 1610 first. After the beacon 1610, the AP 1602 may signal an indication of COCA transmission of response to CF-Poll explicitly using one bit in the PLCP header or MAC header in the modified CF-Poll frame 1612 or implicitly using CRC masking, scrambler initiation seed values, relative phase changes in SIG fields, or pilot values or patterns in the PLCP header in the modified CF-Poll frame 1612. Alternatively, the configuration of COCA transmission of response to CF-Poll frame may be signaled in an association response frame. The group ID of the STAs being polled by the CF-Poll may be carried in the CF-Poll frame 1612 as well. Alternatively, a group broadcast address may be used in the DA field in the MAC header. The AP 1602 ma also indicate the uplink access window for the STAs to send the responses in a COCA manner.

Upon receiving a CF-Poll frame 1612 from the AP 1602 indicating a COCA response should be transmitted, each STA 1604, 1606 and 1608 within the group that has UL data will transmit its respective response 1614a, 1614b and 1614c, which may be aligned at the boundary of the UL access window indicated by the AP 1602 in the CF-Poll frame 1612 or other frames.

The AP 1602 may receive and successfully detect several responses to a CF-Poll frame 1612 transmitted in a COCA manner within the indicated UL access window, and, in response, may send a control frame 1616 announcing the UL transmission schedule for STAs whose responses are detected.

All STAs that transmitted a COCA response to the CF-Poll 1612 may listen for the UL transmission schedule announcement frame 1616 from the AP 1602. If the ID of as STA is included in the UL transmission schedule, it may transmit its data to the AP 1602 according to the schedule. In the example illustrated in FIG. 16, each of the STAs 1604 and 1606 may transmit data 1618a and 1618b according to the schedule, and the AP 1602 may acknowledge receipt of the data with respective ACK frames 1620a and 1620b.

Figure 17:
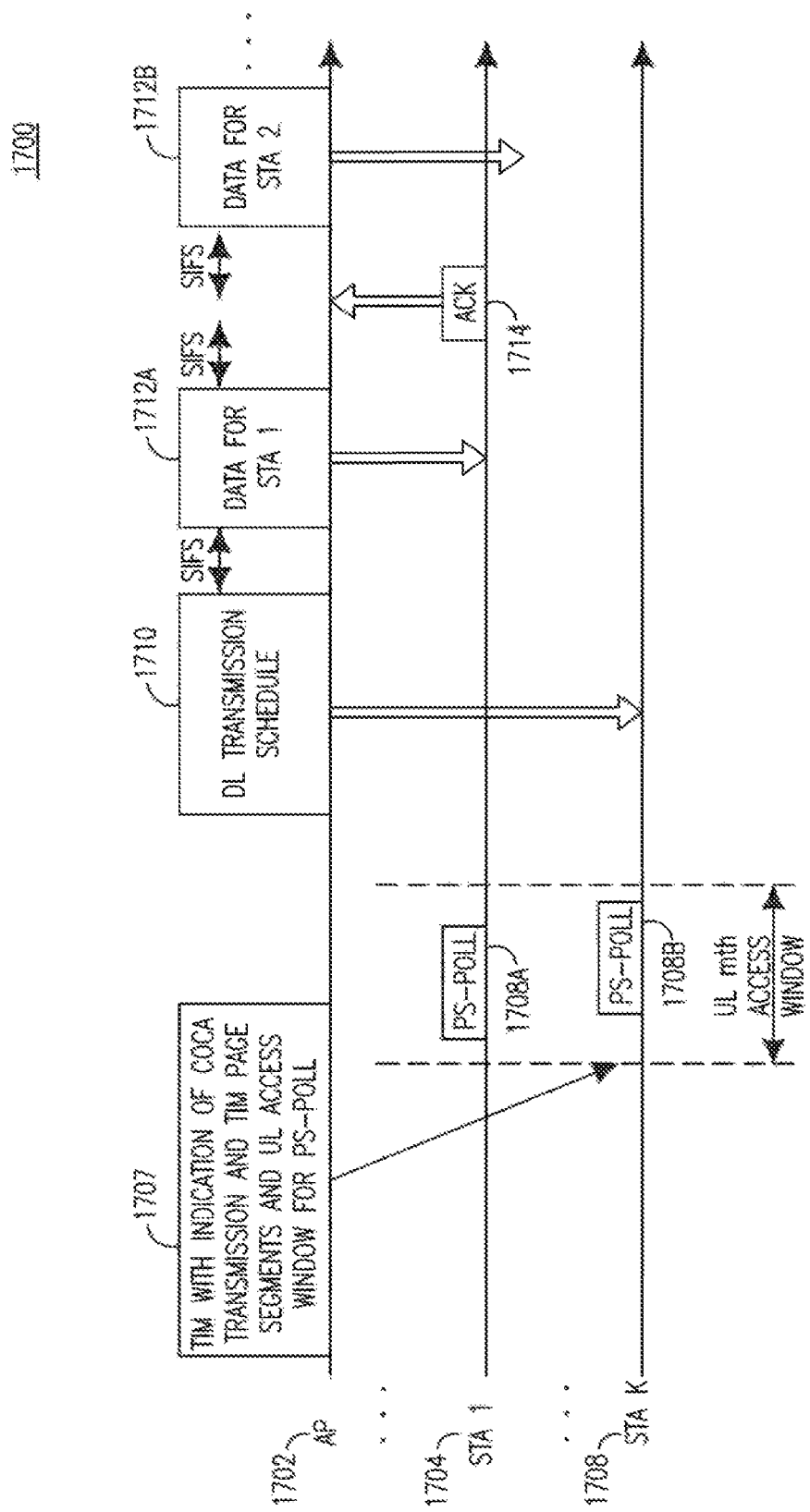
FIG. 17 is a signal diagram of timing and synchronization of response to a CF-Poll using COCA for the methods of FIGS. 15 and 16.

FIG. 17 is a signal diagram 1700 of timing and synchronization of response to CF-Poll using COCA for the methods of FIGS. 15 and 16. In the example illustrated in FIG. 17, multiple UL access windows are defined, and signaled in the beacon first. After the beacon frame, the AP 1702 may explicitly signal an indication of COCA transmission of PS-Poll frames to retrieve DL data using one bit in the TIM 1707, PLCP header, MAC header or an IE in the modified beacon or short beacon frame carrying the TIM 1707. Alternatively, the AP 1702 may implicitly signal an indication of COCA transmission of PS-Poll frame to retrieve DL data using CRC masking, scrambler initiation seed values, relative phase changes in SIG fields, or pilot values or patterns in the PLCP header in the modified CF-Poll frame. The implicit or explicit COCA sequence assignment may be signaled in the beacon or short beacon as well. Alternatively, the configuration of COCA transmissions of a PS-Poll frame to retrieve DL data may be signaled in an association response frame. A subset of valid page segments, block segments or both may be signaled in the beacon to restrict the number of STAs that will receive the TIM 1707, which may define an equivalent group or multiple groups of STAs that may respond with COCA transmission of PS-Poll frames. The AP 1702 may also indicate the UL access window for the STAs to send the PS-Poll frames in a COCA manner.

Upon receiving a positive indication in the TIM 1707, and knowing that a PS-Poll should be transmitted in a COCA manner, each STA 1704 and 1706 within the first group will transmit its respective PS-Poll frame 1708a and 1708b, which may be aligned at the boundary of the UL access window indicated by the AP in the CF-Poll frame or other frames. STAs in subsequent groups indicated in the beacon, if any, may transmit after another triggering frame from the AP 1702.

The AP 1702 may receive and successfully detect several PS-Poll frames transmitted in a COCA manner and, in response, may send a control frame 1710 announcing the DL transmission schedule for STAs whose PS-Poll frames are detected. STAs that transmitted a COCA PS-Poll frame may listen for the DL transmission schedule announcement frame 1710 from the AP 1702. If the ID of a STA is included in the DL transmission schedule 1710, the STA may wake up according to the schedule to receive its DL data from the AP 1702. In the example illustrated in FIG. 17, each of the STAs 1704 and 1706 wakes up to receive its respective DL data 1712a and 1712b. The STA 1704 acknowledges receipt of the DL data 1712a using an ACK frame 1714. STAs that transmitted COCA frames but did not receive a DL transmission schedule may transmit their PS-Polls separately (later on).

When multiple UL control frames are transmitted simultaneously in an orthogonal manner, the existing frame structure, which uses a physical layer convergence procedure (PLCP) header and a medium access control (MAC) header to identify STAs, may not be used. Embodiments are described herein that may provide methods for STA identification to ensure that the AP may identify the transmitter of simultaneously transmitted UL control frames. When the AP successfully receives one or more COCA frames, it may need to identify the transmitter of the COCA frames in order to perform the corresponding subsequent procedures (e.g., as described above).

Figure 18:
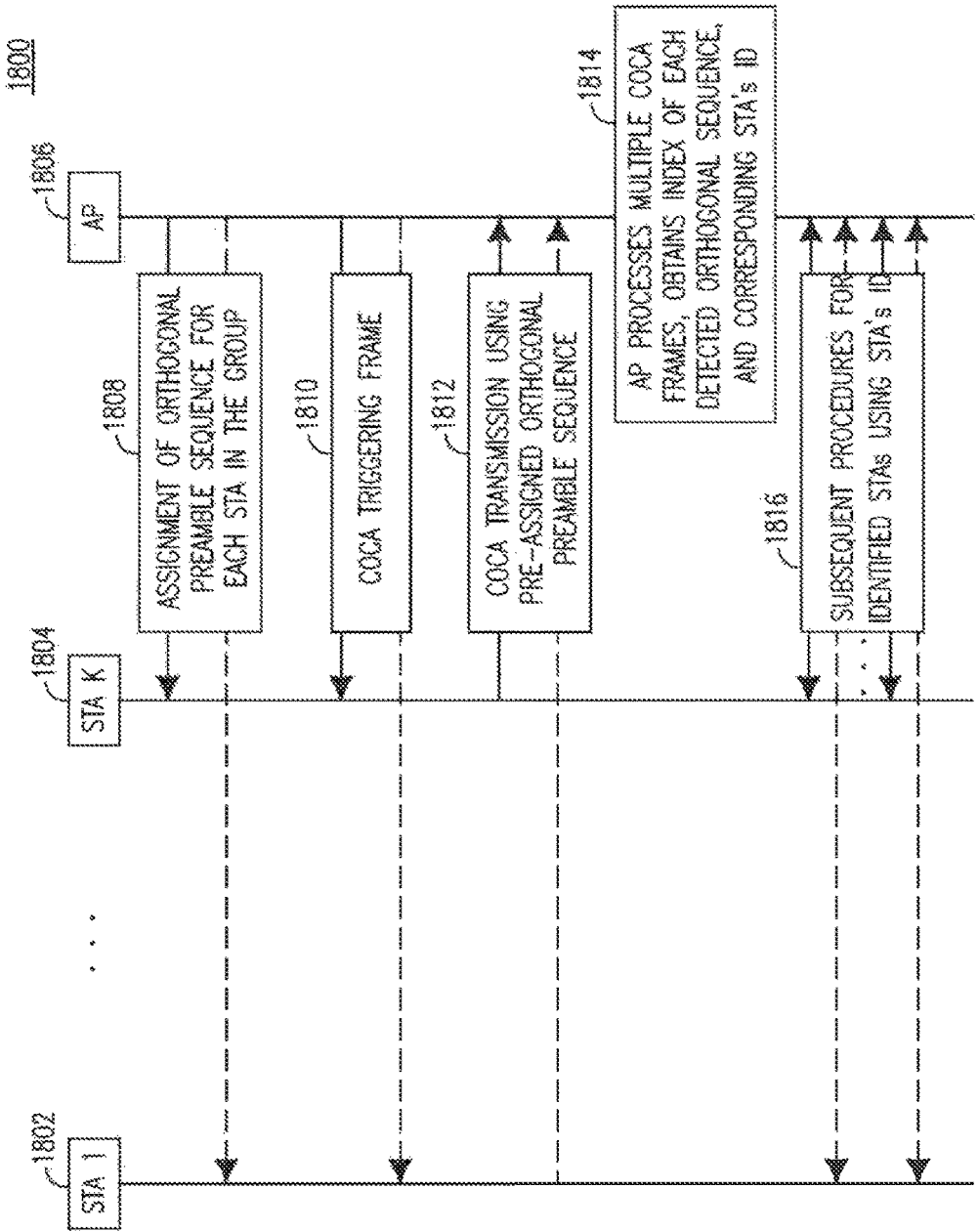
FIG. 18 is a signal diagram of an example method of pre-assigning orthogonal COCA sequences for COCA transmissions.

FIG. 18 is a signal diagram 1800 of an example method of pre-assigning orthogonal COCA sequences for COCA transmissions. In the example illustrated in FIG. 18, the AP 1806 assigns different orthogonal COCA sequences to each STA 1802 and 1804 within a COCA group beforehand (1808). The orthogonal COCA sequence assignment may be signaled (1810) to each STA using the Group Configuration IE/field (e.g., as described above) when the AP 1806 configures a group of STAs for COCA transmission.

Each STA in the COCA group may obtain the information of the orthogonal COCA sequence to use in its COCA transmission by receiving a frame from the AP that contains the Group Configuration IE/field. Then, a one-to-one mapping between the orthogonal COCA sequence index and the ID of the STA (which may be implemented, for example, as a MAC address, AID, PAID, or other form of ID that the AP and the STAs agree upon) is established.

When the AP 1806 successfully receives one or several COCA frames (1812), it may obtain the index of each received orthogonal COCA sequence, and retrieve the ID of the transmitting STA according to the preestablished one-to-one mapping between orthogonal COCA sequence index and the ID of the STA (1814). Then, the AP 1806 may proceed with subsequent procedures with identified STAs (1816).

Figure 19:
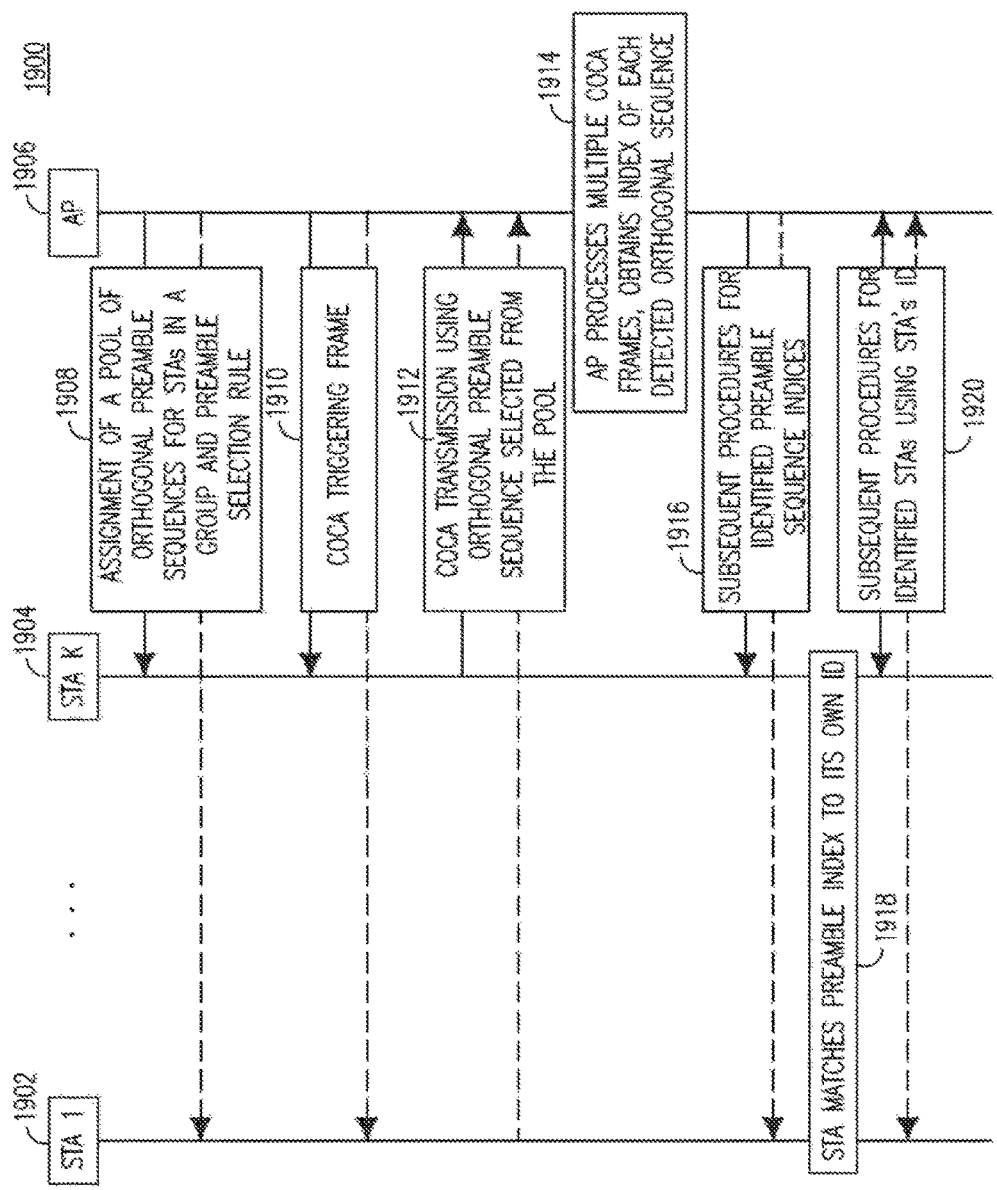
FIG. 19 is a signal diagram of an example method of STA selection of orthogonal COCA sequences for COCA transmissions.

FIG. 19 is a signal diagram 1900 of an example method of STA selection of orthogonal COCA sequences for COCA transmissions. In the example illustrated in FIG. 19, the AP 1906 assigns a pool of orthogonal COCA sequences to a COCA group (and the STAs 1902 and 1904 within the group) beforehand (1908). The AP 1906 may also signal the rule of orthogonal sequence/preamble selection. The orthogonal COCA sequence pool assignment may be signaled to each of the STAs 1902 and 1904 using the Group Configuration IE/field (e.g., as described above) when the AP configures a group of STAs for COCA transmission (1910). Alternatively, the assignment of the orthogonal sequence/preamble pool and/or the random selection rule may be specified in the standards, and, therefore, may not be signaled to the STAs.

For example, the pool of COCA sequences may be determined solely by the COCA group ID. Hence, the group ID that the STA receives in the Group Configuration IE/field may implicitly signal the information of the pool of COCA sequences for COCA transmission. In another example, the selection rule of the COCA sequence may be implemented to be a Hash function of AID, timestamp and BSSID or MAC address, etc. Hence, the STA may obtain the orthogonal sequence/preamble index it should use in COCA transmission as given by: Sequence index=Hash(AID, BSSID, TSF).

Each STA 1902 and 1904 in the COCA group may obtain the information of the pool of orthogonal COCA sequences to use for COCA transmission and a COCA sequence selection rule by receiving the frame from the AP 1906 that includes the Group Configuration IE/field. Each of the STAs may select one COCA sequence from the pool of COCA sequences according to the selection rule.

When the AP 1906 successfully receives one or several COCA frames (1912), it may obtain the index of each received orthogonal COCA sequence (1914). However, it may not obtain the transmitting STA's ID. For example, in the case where the random selection rule is used, the AP 1906 may not determine the transmitter's ID at all. For another example, in the case where the orthogonal sequence/preamble selection rule is a hash function of AID, timestamp and BSSID or MAC address, the AP 1906 may not unambiguously determine the transmitter's ID. For the case where two or more STAs choose the same sequence, contention resolution may be used to solve the ambiguity.

The AP 1906 may proceed to subsequent procedures using a temporary ID for a STA in the next frame transmitted to the STAs (1916). The temporary ID for a STA may simply be the index of the received/detected COCA sequence. The temporary ID may be used for replacement of AID or PAID (or other type of STA ID) in the PLCP header or the MAC header.

The STA may receive a frame including a temporary ID (i.e., the index of the received/detected COCA sequence) from the AP 1906. If the index of its transmitted COCA sequence matches the index of received/detected COCA sequence (1918), the STA may know that its COCA transmission (i.e. the orthogonal sequence/preamble) was successfully received by the AP 1906 and that this frame is targeted for it. The STA may proceed to the subsequent procedures using its STA ID (1920).

Examples are provided below for response to CF-Poll and TIM-based DL data retrieval.

FIG. 20 is a signal diagram 2000 of an example of UL data transfer using COCA transmission of response to CF-Poll frame. In the example illustrated in FIG. 20, the AP 2002 announces the UL transmission schedule (2014) using a temporary ID for each STA 2004, 2006 and 2008 (i.e., the index of each received/detected COCA sequence). Upon receiving the UL transmission schedule 2014, a STA will check whether the index of its transmitted response to CF-Poll is included. If yes, the STA may know that its COCA transmission (i.e., the orthogonal sequence/preamble) was successfully received by the AP. Then, the STA will proceed to transmit its UL data to the AP 2002 using its STA ID according to the UL transmission schedule. In the example illustrated in FIG. 20, each of the STAs 2004 and 2006 transmits data 2016A and 2016B. The AP 2002 acknowledges receipt of the data using ACK frames 2018A and 2018B, respectively. In the case where two or more STAs choose the same orthogonal sequence/preamble, the AP may or may not be able to detect the sequence.

If the AP does not detect the sequence, the sequence index may not be included in the subsequent UL transmission schedule 2014. Then, STAs that transmitted the sequence before may think that their responses to the CF-Poll were not detected by the AP 2002 and will re-try later on in either a future CFP or a future channel contention window.

If the AP 2002 successfully detects the sequence, the AP 2002 may announce the DL transmission schedule 2014 using the index of the detected COCA sequence. STAs that transmitted this sequence before may think that their responses to the CF-Poll succeeded and, accordingly, may transmit their UL data to the AP 2002 using their respective STA IDs according to the UL transmission schedule. Their UL data may have a collision, and, accordingly, the AP 2002 may or may not, be able to successfully decode one of the data received simultaneously.

If the AP 2002 successfully decodes the data of one STA, it may send an ACK frame with the corresponding STA's ID. The contention resolution is then solved. The STA that receives the ACK with its STA ID knows that its UL data was successfully decoded. Other STAs that transmitted their data at the same time may re-try later on (in either a future CFP or a future channel contention window).

If the AP does not decode any data successfully, an ACK frame may not be sent. STAs that transmitted their data at the same time may re-try later on in either a CFP or a channel contention window).

In another example, the AP may implicitly assign sequences to STAs in a COCA group by the order of positive TIM indication. A mapping between the order of positive indication in the TIM and the index of the orthogonal sequence/preamble may be pre-defined in the standards. A set of orthogonal sequences/preamble {sequence/preamble N1, sequence/preamble N2, . . . , sequence/preamble Nk} may be mapped to k positive TIM indications. When a STA wakes up to listen to the beacon and TIM, if it receives a positive indication for itself in the TIM, it may read the other entries in the TIM and obtain its order within the TIM. Then, the STA may obtain the index of the orthogonal sequence/preamble it should use for COCA PS-Poll transmission according to the pre-defined mapping positive indication in the TIM and the index of orthogonal sequence/preamble. For example, the positive indication that the STA receives may be the pth positive indication in the TIM. Here, the orthogonal sequence/preamble Np may be used by the STA for its COCA PS-Poll transmission. One beacon or short beacon frame may indicate a set of orthogonal COCA sequences for one or several beacon intervals. The rest of the behaviors and procedures of an AP and STAs for downlink data retrieval using COCA PS-Poll may be the same as those described with respect to FIG. 20 above.

IEEE 802.11 does not currently provide for carrying information on multiple simultaneously transmitted control channels. However, there are procedures and scenarios where multiple simultaneously transmitted control channels need to carry information, such as a short message. Embodiments are described herein that provide for control frames that enable information to be carried on multiple simultaneously transmitted control channels.

In some scenarios, a STA may need to carry some information (e.g., a very small amount of information) on the COCA transmission to the AP. For example, the STA may need to carry information indicating that the amount of uplink data at the STA is greater than a threshold or information indicating that the channel condition at the STA is better than a threshold. The detailed information and associated amount of information to be carried on the COCA transmission may depend on a specific use case. Example methods for carrying information on a COCA transmission are described below.

In an embodiment, the pool of orthogonal COCA sequences may be pre divided into N subsets beforehand. In addition to the aforementioned orthogonal sequence/preamble selection rule, a STA performing a COCA transmission may also select a subset out of N subsets of COCA sequences. A pre-determined orthogonal sequence/preamble subset selection rule may be specified in the standards to allow the STA to implicitly carry up to $\log_2 N$ bits of information in each COCA transmission by selecting the subset of COCA sequences accordingly.

In another embodiment, the pool of orthogonal COCA sequences are pre-divided into N subsets beforehand, and a pre-determined orthogonal sequence/preamble subset selection rule may be specified in the standards. For example, in the use case of response to CF-Poll, N levels of uplink data amount may be mapped to N subsets of COCA sequences. A STA performing COCA transmission may select a subset out of the N subsets of COCA sequences accordingly. For example, in the use case of response to CF-Poll, a subset of COCA sequences may be selected according to the amount of uplink data at the STA. Then, within the selected subset, the STA may select one COCA sequence according to the orthogonal sequence/preamble selection rule (random or hash function of STA ID, BSSID, etc.). Then, the AP may receive and detect the COCA transmission from the STA, and it may obtain the index of the received COCA sequence and corresponding subset index. Then, the AP may retrieve the implicit information according to the pre-determined orthogonal sequence/preamble subset selection rule.

FIG. 21 is a diagram of an example COCA frame 2100 carrying a message and/or information. A COCA frame may include M OFDM symbols. The selected orthogonal sequence/preamble, for example, a constant amplitude zero auto-correlation (CAZAC) polyphase sequence used for the STA's COCA transmission, may be mapped to each OFDM symbol. $M_1$ out of the M OFDM symbols may be used to carry information. A BPSK/QPSK data symbol may be multiplied on each of $M_1$ OFDM symbols. In the example illustrated in FIG. 21, $d_i$ {i=1, 2, . . . } is the information carried on the COCA frame 2100, and S is the orthogonal sequence/preamble used for the COCA frame 2100.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include, electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of coordinated orthogonal channel access (COCA) among a plurality of wireless transmit/receive units (WTRUs), the method comprising:
a WTRU indicating that the WTRU has a capability for COCA procedures by setting a Capability information element (IE) in one of a control frame or a management frame;
the WTRU receiving a trigger to transmit an uplink (UL) response frame on a channel simultaneously with at least one other of the plurality of WTRUs, wherein the trigger is a poll frame; and
the WTRU transmitting the UL response frame on the channel an interframe space after the poll frame using an assigned orthogonal sequence associated with an association ID (AID) of the WTRU.

2. The method of claim 1, wherein the poll frame is a contention-free poll (CF-Poll) frame and the response frame is a response to the contention-free poll (CF-Poll) frame.

3. The method of claim 1, wherein the WTRU includes at least one bit of information in the response frame.

4. The method of claim 1, wherein the information included in the response frame provides at least one of an indication that an amount of UL data at the WTRU is greater than a first threshold or an indication that a channel condition at the WTRU is greater than a second threshold.

5. The method of claim 1, wherein the WTRU selects the unique orthogonal sequence from a pool of orthogonal sequences assigned to a group that the WTRU belongs to.

6. The method of claim 5, wherein:
the pool of orthogonal sequences is pre-divided into N subsets, and
at least one of the N subsets is associated with a rule that allows a WTRU that selects a respective one of the at least one of the N subsets to transmit a maximum amount of $\log_2 N$ bits of information when transmitting the response frame.

7. The method of claim 5, wherein:
the pool of orthogonal sequences is pre-divided into N subsets, and
N levels of UL data are mapped to the N subsets.

8. The method of claim 5, wherein:
the response frame includes M orthogonal frequency-division multiplexing (OFDM) symbols,
the selected unique orthogonal sequence is mapped to each of the M OFDM symbols, and
a subset M1 of the M OFDM symbols carries the information.

9. A wireless transmit/receive unit (WTRU) comprising:
a processor; and
a transceiver,
the processor and the transceiver configured to indicate that the WTRU has capability for COCA procedures by setting a Capability information element (IE) in one of a control frame or a management frame,
the processor and the transceiver further configured to receive a trigger to transmit an uplink (UL) response frame on a channel simultaneously with at least one other WTRU, wherein the trigger is a poll frame,
the processor and the transceiver further configured to transmit the UL response frame on the channel an interframe space after the poll frame using an assigned orthogonal sequence associated with an association ID (AID) of the WTRU.

10. The WTRU of claim 9, wherein the poll frame is a contention-free-poll (CF-Poll) frame and the response frame is a response to the CF-Poll frame.

11. The WTRU of claim 9, wherein the WTRU is a non-access point (non-AP) station (STA) in an Institute of Electrical and Electronics Engineers (IEEE) 802.11 basic service set (BSS).

12. The WTRU of claim 9, the processor and the transceiver further configured to include at least one bit of information in the response frame.

13. A base station configured to coordinate orthogonal channel access (COCA) among a plurality of wireless transmit/receive units (WTRUs), the base station comprising:
a processor; and
a transceiver,
the processor and the transceiver configured to receive an indication from at least two of the plurality of WTRUs in a Capability information element (IE) in one of a control frame or a management frame, indicating that the at least two of the plurality of WTRUs have capability for COCA procedures,
the processor and the transceiver further configured to trigger at least two of the plurality of WTRUs to simultaneously transmit an uplink (UL) frame on a channel
the processor and the transceiver further configured to receive a respective frame from each of the at least two WTRUs that were transmitted simultaneously in response to the trigger using an assigned orthogonal sequence associated with an association ID (AID) of each respective one of the at least two of the plurality of WTRUs,
the processor and the transceiver further configured to associate each received frame with a respective one of the at least two of the plurality of WTRUs based on the orthogonal sequence.

14. The base station of claim 13, wherein the base station is an access point (AP) in an Institute of Electrical and Electronics Engineers (IEEE) 802.11 basic service set (BSS).

15. The base station of claim 13, the processor and the transceiver further configured to receive, from the at least two of the plurality of WTRUs, an indication that the WTRU has a capability for COCA procedures.

16. The base station of claim 13, wherein the transmit unit is further configured to inform each of the at least two of the plurality of WTRUs of one of more grouping using frames that include a COCA Group Configuration IE.

17. The base station of claim 13, wherein:
the UL frame is received from each of the at least two of the plurality of WTRUs an inter-frame space (IFS) after the poll frame.
18. The base station of claim 13, wherein:
the transceiver is further configured to transmit to each of the at least two of the plurality of WTRUs information about a pre-defined UL access window, and
the transceiver is further configured to receive a control frame from each of the at least two of the plurality of WTRUs during the pre-defined UL access window.
19. The base station of claim 13, wherein the UL frame includes at least one bit of information.

* * * * *